United States Patent
Shibamori

(10) Patent No.: US 11,947,787 B2
(45) Date of Patent: Apr. 2, 2024

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Tomoki Shibamori, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/835,240

(22) Filed: Jun. 8, 2022

(65) Prior Publication Data
US 2023/0008933 A1   Jan. 12, 2023

(30) Foreign Application Priority Data
Jul. 7, 2021 (JP) ................................ 2021-112992

(51) Int. Cl.
G06F 3/048    (2013.01)
G06F 3/0486   (2013.01)

(52) U.S. Cl.
CPC ................................. *G06F 3/0486* (2013.01)

(58) Field of Classification Search
CPC .. G06F 3/0486; G06F 3/0483; G06F 3/04845; G06F 3/1205; G06F 3/1253; G06F 3/1256; H04N 1/00411; H04N 1/00456; H04N 1/3872
See application file for complete search history.

(56) References Cited

U.S. PATENT DOCUMENTS

| 7,643,187 B2 * | 1/2010 | Tagawa | G03G 15/502 358/1.14 |
| 2004/0163047 A1 * | 8/2004 | Nagahara | G06F 40/166 715/255 |
| 2010/0079773 A1 * | 4/2010 | Hu | G06F 40/103 358/1.5 |
| 2012/0079375 A1 * | 3/2012 | Ogino | H04N 1/00458 715/274 |
| 2012/0092690 A1 * | 4/2012 | Saito | G06F 3/1204 358/1.13 |
| 2013/0120405 A1 * | 5/2013 | Maloney | G06T 13/00 345/474 |
| 2014/0157189 A1 * | 6/2014 | Morita | G06F 3/0485 715/784 |

(Continued)

FOREIGN PATENT DOCUMENTS

EP    2595050 B1 * 8/2021 .......... G03G 15/502
JP    2006040118 A  * 2/2006

(Continued)

*Primary Examiner* — Rashawn N Tillery
(74) *Attorney, Agent, or Firm* — Venable LLP

(57) ABSTRACT

An image processing apparatus includes a display control unit configured to display a preview on a screen, the preview including a plurality of sheet regions and objects placed on the sheet regions, a reception unit configured to select one or more of the objects placed on the sheet regions in response to a user input and to receive a drag operation, and a move unit configured, in moving a plurality of the objects at once in response to an operation received by the reception unit, to gather the plurality of objects onto a same sheet region without maintaining a positional relation between the objects in a case when a particular condition is satisfied.

15 Claims, 21 Drawing Sheets

(56) References Cited

U.S. PATENT DOCUMENTS

| | | | | |
|---|---|---|---|---|
| 2018/0136810 A1* | 5/2018 | Martin | ................ | G06F 3/04845 |
| 2019/0149676 A1* | 5/2019 | Hori | ................... | H04N 1/00665 |
| | | | | 358/1.18 |
| 2019/0347053 A1* | 11/2019 | Aoyama | ................. | G06F 3/125 |
| 2020/0012460 A1* | 1/2020 | Shibamori | .............. | G06F 3/125 |
| 2020/0264815 A1* | 8/2020 | Fujiwara | ............... | G06F 3/1256 |
| 2020/0409637 A1* | 12/2020 | Hori | ...................... | G06F 3/1256 |
| 2022/0137900 A1* | 5/2022 | Kawaguchi | ........ | H04N 1/00453 |
| | | | | 358/1.1 |
| 2022/0321731 A1* | 10/2022 | Nakamoto | ......... | H04N 1/00466 |

FOREIGN PATENT DOCUMENTS

| | | | | | |
|---|---|---|---|---|---|
| JP | 2007086824 | A | * | 4/2007 | |
| JP | 2008052344 | A | * | 3/2008 | ........... G06F 3/0486 |
| JP | 2015065508 | A | * | 4/2015 | |
| JP | 2017097814 | A | * | 6/2017 | ........... G06F 3/0416 |
| JP | 2019091350 | A | | 6/2019 | |

* cited by examiner

LAYOUT INFORMATION ON SHEET REGION

| ITEM | VALUE |
| --- | --- |
| INDEX FOR SHEET REGION | 1 |
| POSITION OF SHEET REGION | (0,0) |
| SHEET ORIENTATION | PORTRAIT |
| SHEET WIDTH | 210 |
| SHEET HEIGHT | 297 |

FIG.5A

LAYOUT INFORMATION ON IMAGE OBJECT

| ITEM | VALUE |
| --- | --- |
| PARENT SHEET REGION | 1 |
| POSITION RELATIVE TO PARENT SHEET REGION | (5,5) |
| IMAGE OBJECT ORIENTATION | PORTRAIT |
| IMAGE OBJECT WIDTH | 200 |
| IMAGE OBJECT HEIGHT | 287 |

FIG.5B

| ITEM | BEFORE MOVE | AFTER MOVE |
|---|---|---|
| PARENT SHEET REGION | 1 | 2 |
| POSITION RELATIVE TO PARENT SHEET REGION | (20,20) | (20,80) |

FIG.9

IMAGE PROCESSING APPARATUS, IMAGE PROCESSING METHOD, AND STORAGE MEDIUM

CROSS REFERENCE TO PRIORITY APPLICATION

This application claims the benefit of Japanese Patent Application No. 2021-112992, filed Jul. 7, 2021, which is hereby incorporated by reference herein in its entirety.

BACKGROUND OF THE INVENTION

Field of the Invention

The present invention relates to a technique for editing objects with an image processing apparatus.

Description of the Related Art

There is conventionally an image processing apparatus that displays an image object on a preview screen, performs processing to place or to edit the image object based on a user operation, and then issues a print instruction to a printing apparatus.

Japanese Patent Laid-Open No. 2019-91350 (hereafter the '350 document) discloses a method that displays a plurality of pages and image objects on a preview screen, changes the layout based on a layout operation received from a user, such as moving an image object, and prints the layout result.

SUMMARY OF THE INVENTION

However, a configuration in which a plurality of objects are placed on a plurality of pages as in the '350 document requires a user to give a number of operation instructions in a case where the user wants to gather and place those objects onto one page.

An image processing apparatus according to one aspect of the present invention includes a display control unit configured to display a preview on a screen, the preview including a plurality of sheet regions and objects placed on the sheet regions, and a move unit configured in moving a plurality of the objects at once in response to an operation received by the reception unit, to gather the plurality of objects onto a same sheet region without maintaining a positional relation between the objects in a case when a particular condition is satisfied.

Further features of the present invention will become apparent from the following description of exemplary embodiments with reference to the attached drawings.

BRIEF DESCRIPTION OF THE DRAWINGS

FIGS. 5A and 5B are diagrams showing an example of layout information;

FIG. 9 is a diagram showing an example of layout information;

DESCRIPTION OF THE EMBODIMENTS

Preferred embodiments of the present invention are described in detail below with reference to the attached drawings. Note that the following embodiments are not intended to limit the present invention according to the scope of claims, and not all the combinations of features described in the present embodiments are necessarily essential to the solutions provided by the present invention.

Before giving descriptions of the embodiments, a supplementary description is given to explain how, in a configuration in which a plurality of image objects are placed on a plurality of pages, a user needs to give a number of operation instructions to gather and place those image objects onto a single page.

Figure 1:
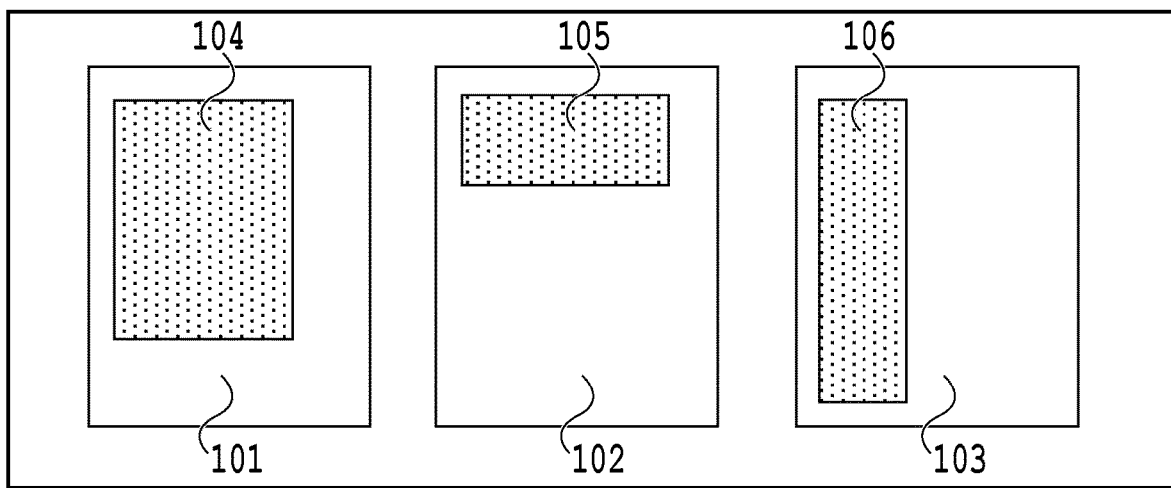
FIG. 1 is a diagram illustrating a problem in moving a plurality of images.

FIG. 1 is a diagram showing a screen displayed and controlled by a display unit on an image processing apparatus. Sheet regions 101, 102, and 103 are displayed on a screen, with an image object 104 placed on the sheet region 101, an image object 105 on the sheet region 102, and an image object 106 on the sheet region 103. Upon receipt of an image object moving operation from a user, the image processing apparatus moves the image object to a position instructed by the user and causes the screen to reflect the move. In this event, the user can select a plurality of image objects displayed on the image processing apparatus in bulk and make a move instruction collectively.

A case is discussed here of gathering and placing all the image objects onto the sheet region 102 in FIG. 1. In this case, a user needs to move the image object 104 to the sheet region 102 and then move the image object 106 onto the sheet region 102, which means that two operations are required to gather the image objects onto the sheet region 102. By contrast, in a case when the user selects the image object 104 and the image object 106 in bulk and gives an instruction to move them to the sheet region 102 collectively, one of the image objects is placed on the sheet region 102, but the other one is placed outside the sheet region 102. Thus, the other object placed outside the sheet region 102 needs to be selected again and moved to the sheet region 102. In this way, even in a case of giving an instruction to move a plurality of image objects together after selecting them in bulk, two operations are required to gather the image objects onto the sheet region 102.

Although the example described above has three sheet regions and three image objects, an even larger number of move instructions are required in cases when there are more sheet regions and image objects, leading to cumbersome gathering work. In the following embodiments, methods for moving image objects by switching a move control method based on a particular condition are described.

Embodiment 1

<Hardware Configuration of the Image Processing Apparatus>

Figure 2:
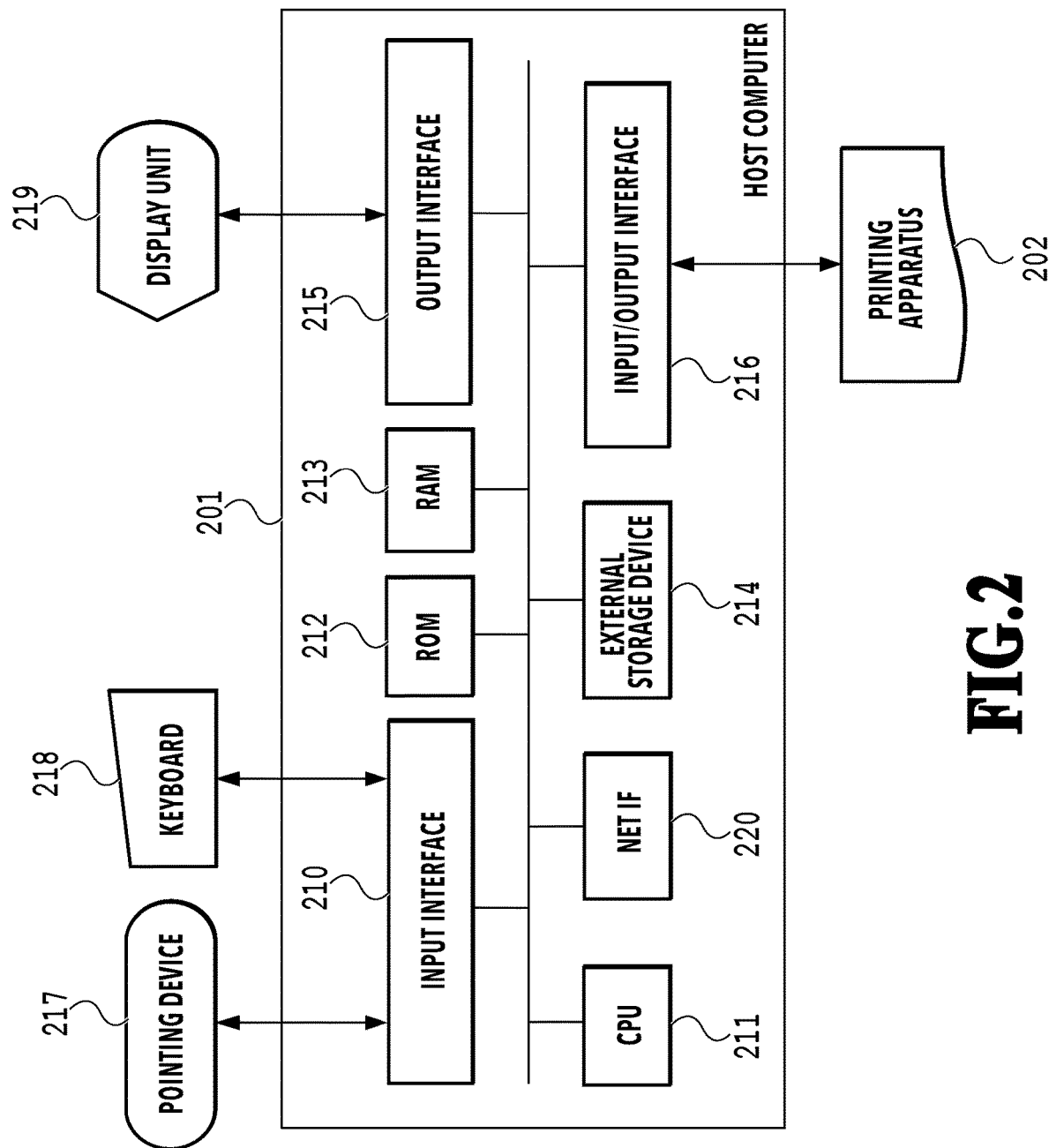
FIG. 2 is a block diagram showing the hardware configuration of an image processing apparatus.

FIG. 2 is a block diagram showing an example hardware configuration of an image processing apparatus. In FIG. 2, a host computer 201 is an example of the image processing apparatus and has an input interface 210, a CPU 211, a ROM 212, and a RAM 213. The host computer 201 also has an external storage device 214, an output interface 215, an input/output interface 216, and a network interface (NET IF) 220.

The CPU 211 implements the functions of the host computer 201 to be described later and the processing according to the flowchart to be described later by performing processing in accordance with procedures of programs stored in the ROM 212. An initialization program is stored in the ROM 212, and application programs, an operating system (OS), a driver for a printing apparatus, and other various pieces of data are stored in the external storage device 214. The RAM 213 is used as, e.g., work memory in the execution of the various programs stored in the external storage device 214.

An input device such as a keyboard 218 or a pointing device 217 is connected to the input interface 210, and a display unit 219 including a display device such as a display or a touch panel is connected to the output interface 215. The NET IF 220 performs control of data transfer to and from an external device via a network. A printing apparatus 202, which is a device, is connected to the host computer 201 via the input/output interface 216. Although the host computer 201 and the printing apparatus 202 are configured separately herein, they may be configured as one image processing apparatus instead.

<Software Configuration of the Image Processing Apparatus>

Figure 3:
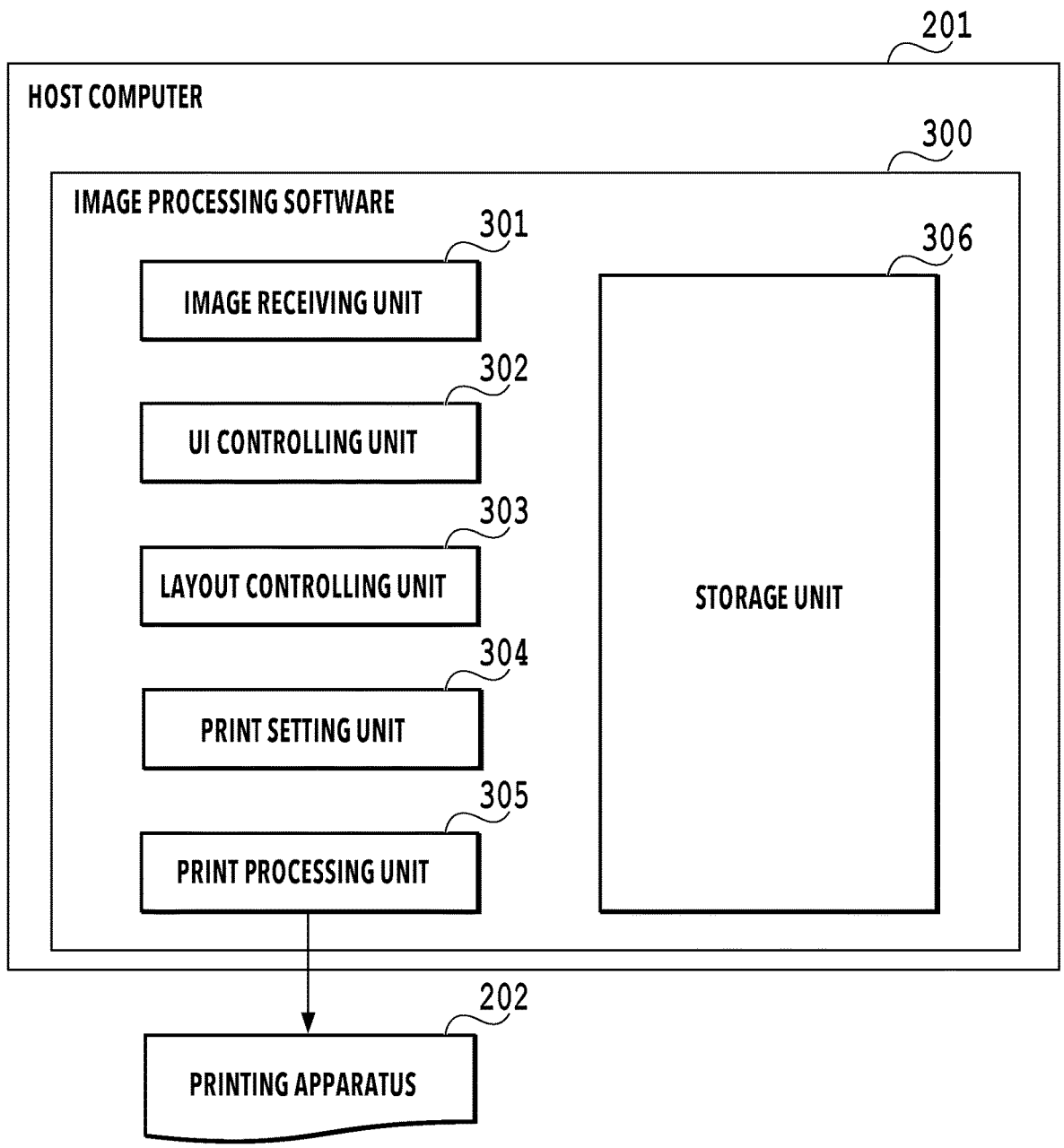
FIG. 3 is a block diagram showing the software configuration of the image processing apparatus.

FIG. 3 is a block diagram showing an example software configuration of the host computer 201 of the present embodiment. Mainly, the functions of image processing software 300 installed in the host computer 201 are described with FIG. 3. The image processing software 300 has an image receiving unit 301, a UI controlling unit 302, a layout controlling unit 303, a print setting unit 304, a print processing unit 305, and a storage unit 306.

Hereafter, the functional blocks of the image processing software 300 may be described as if they are the ones that perform processing, but, in actuality, the CPU 211 executes a corresponding program to implement a corresponding function. Although in the present embodiment, a mouse is used as an example of a pointing device via which a user operation is received, the present invention is actually not limited to this. For example, as an alternative configuration, the display unit 219 of the host computer 201 may have a touch panel, and the image processing software 300 may perform processing by receiving operations performed by touch operations.

The image receiving unit 301 receives an image object such as an image or graphic data, and then stores the image object in the storage unit 306 in a format easily controllable by the image processing software 300. For example, the image receiving unit 301 may store, in the storage unit 306, original data used for printing and a thumbnail image generated by rendering the image object at a low resolution. This can improve the performance of the UI controlling unit 302 to be described later in displaying the image object.

The print setting unit 304 receives, from a user, designation of printing settings necessary for the printing apparatus 202 to perform printing, such as sheet size and sheet orientation, and stores the received printing settings in the storage unit 306. The layout controlling unit 303 performs image object layout processing based on a user operation received by the UI controlling unit 302. Examples of layout processing include editing of image objects, moving the positions of image objects, and changing the front and back (front layer and back layer) positional relation between image objects.

Based on the print settings set by the print setting unit 304 and layout information, the UI controlling unit 302 displays sheet regions indicating the regions of print media or image objects on the display unit 219. Layout information is information used to manage the position coordinates and size of each sheet region or image object. Layout information is used in displaying a sheet region or an image object on the display unit 219 or in generating print data printable by the printing apparatus 202. Details of layout information will be described later with reference to FIGS. 5A and 5B.

The UI controlling unit 302 also receives operations such as a mouse operation performed by a user. Upon receipt of an operation of moving an image object through a mouse drag operation, the UI controlling unit 302 obtains movement information including the start position and the end position of the drag operation. Next, based on the movement information obtained, the layout controlling unit 303 performs image object layout processing and updates the layout information based on the results of the processing. After that, based on the updated layout information, the UI controlling unit 302 displays the image objects on the display unit 219 as laid out by the layout processing.

The storage unit 306 stores therein information necessary to perform a series of layout processing and printing processing in the image processing software 300, such as information on image objects, layout information, or print settings information. In the event when the UI controlling unit 302 receives a print instruction operation from a user, the print processing unit 305 starts print processing. The print processing unit 305 generates a drawing command based on the image objects, their layout information, and print settings stored in the storage unit 306, and issues a print instruction to the printing apparatus 202 using the driver stored in the external storage device 214.

Although, in the present embodiment, the image processing software 300 causes the printing apparatus 202 to execute printing by using the driver corresponding to the printing apparatus 202 stored in the external storage device 214, the print execution method is not limited to this. For example, as an alternative configuration, the image processing software 300 may cause the printing apparatus 202 to execute printing by generating print data that can be interpreted by the printing apparatus 202 and transmitting the print data to the printing apparatus 202 through direct communication therewith via the NET IF 220, or the like.

<Example Preview Screen of Image Processing Software>

Figure 4:
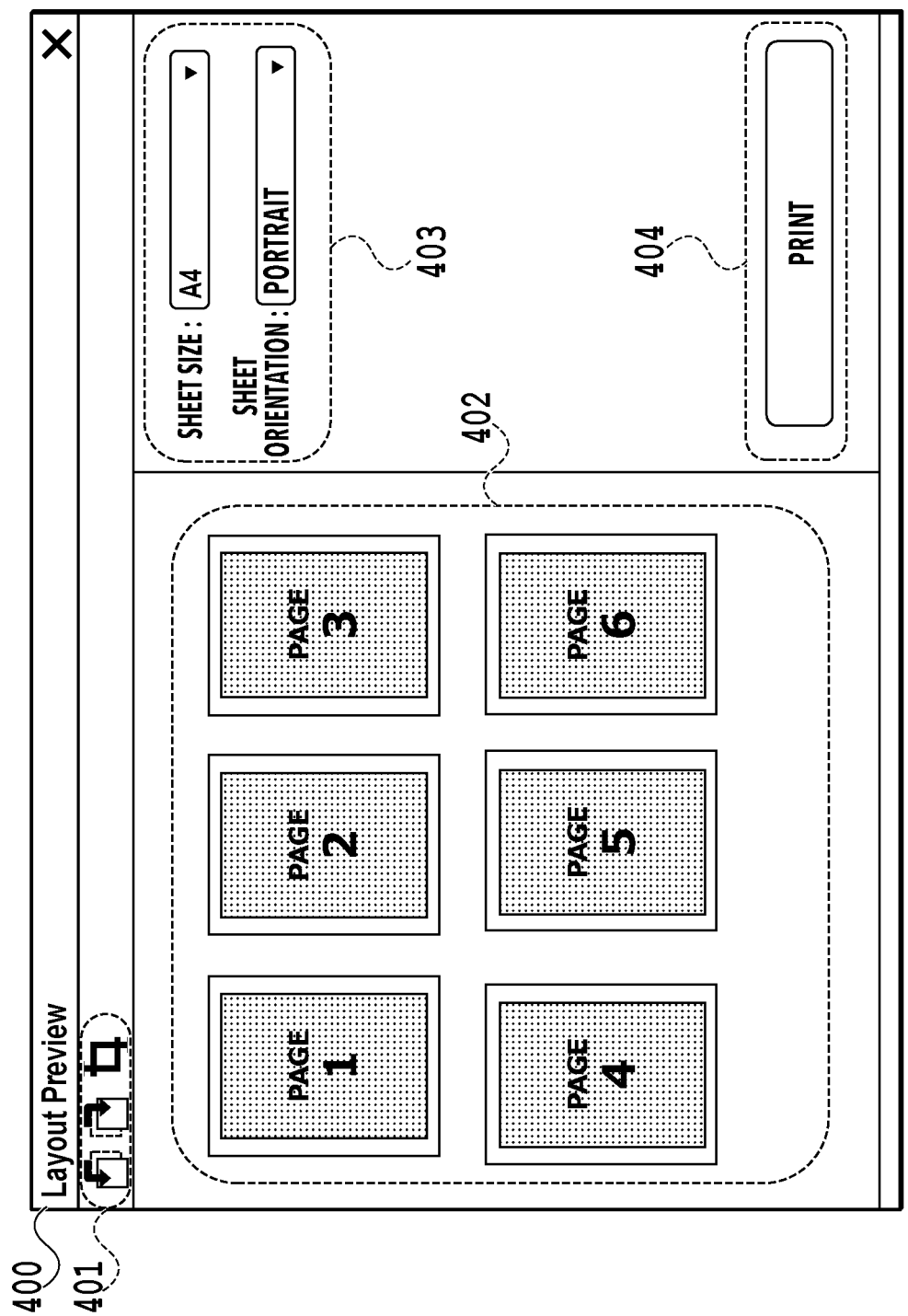
FIG. 4 is a diagram showing an example screen displayed on a display unit of the image processing apparatus.

FIG. 4 is an example of a preview screen displayed by the image processing software 300. A preview screen 400 has an edit toolbar part 401, a preview part 402, a setting part 403, and a print operation part 404.

In the edit toolbar part 401, buttons for editing image objects are placed, and by pressing a button associated with corresponding processing, a user can perform an editing operation such as changing the orientation of the selected image object or trimming the selected image object. In the preview part 402, sheet regions and image objects on the sheet regions are displayed, and, by selecting and performing an operation of dragging an image object with a mouse, a user can perform an edit operation such as moving, scaling up, scaling down, or trimming the image object.

Although in the present embodiment, the sheet regions are arranged from the upper left to the lower right in the preview part 402 in the order of page numbers with given spaces provided therebetween, the method for arranging sheet regions is not limited to this. For example, as alternative configurations, sheet regions may be arranged from the upper right to the lower left or from top to bottom vertically to form a single line on the preview part 402. As yet another alternative, a control part that can receive the designation of the number of display rows of sheet regions may be placed in the edit toolbar part 401 or the like so that the sheet regions can be arranged in any number of rows designated by a user.

Note that each image object belongs to one of the sheet regions and is drawn by the UI controlling unit 302 on top of the sheet region to which the image object belongs. Further, more than one image object can be placed on a single sheet region. A description will be given later of processing to move image objects with reference to FIGS. 7 and 8. In the present embodiment, there is no limitation as to how image objects are placed initially immediately after the image receiving unit 301 of the image processing software 300 receives the image objects. For example, the image objects may be placed and displayed on the preview part 402 such that one image object is inscribed in each sheet region. Although an image object is used in the following description as an example of an object, the present embodiment can also be applied to cases where an object is not an image, but text, or the like.

In the setting part 403, a control part that can be used to designate the size and orientation of a sheet used for printing is placed. Once a user selects the control part, settable items are displayed based on the ability information on the printing apparatus 202. In a case when the size or orientation of a sheet is changed, the layout controlling unit 303 in FIG. 3 may re-place the sheet regions and the image objects. As a possible re-placement method, as with the initial placement method, the sheet regions and the image objects may be re-placed so that one image object is inscribed in each sheet region.

In the print operation part 404, a print button is placed, and once a user presses the print button, the image processing software 300 generates print data based on layout information and print settings and issues a print instruction to the printing apparatus 202.

<Layout Information>

FIGS. 5A and 5B are diagrams showing layout information on a sheet region and an image object. FIG. 5A shows layout information on a sheet region, and FIG. 5B shows layout information on an image object. First, layout information on a sheet region shown in FIG. 5A is described. Layout information on a sheet region has the following information: an index for the sheet region, the position of the sheet region, the orientation of the sheet, sheet width, and sheet height. The index for the sheet region is a unique number assigned to the sheet region, which is, for example, a page number, or the like. FIG. 5A shows layout information on a sheet region on the first page. The position of the sheet region indicates the position of the sheet region on the preview part 402 in FIG. 4, and, in FIG. 5A, the position coordinates of the upper left portion of the sheet region is stored as a value, as an example of the position of a sheet region. The sheet orientation is determined by the sheet orientation set in the setting part 403 and indicates whether the sheet is displayed in portrait or in landscape. The sheet width and the sheet height are determined based on the sheet size set in the setting part 403 and are used along with the position of the sheet region to display the sheet region on the preview part 402.

Figure 6:
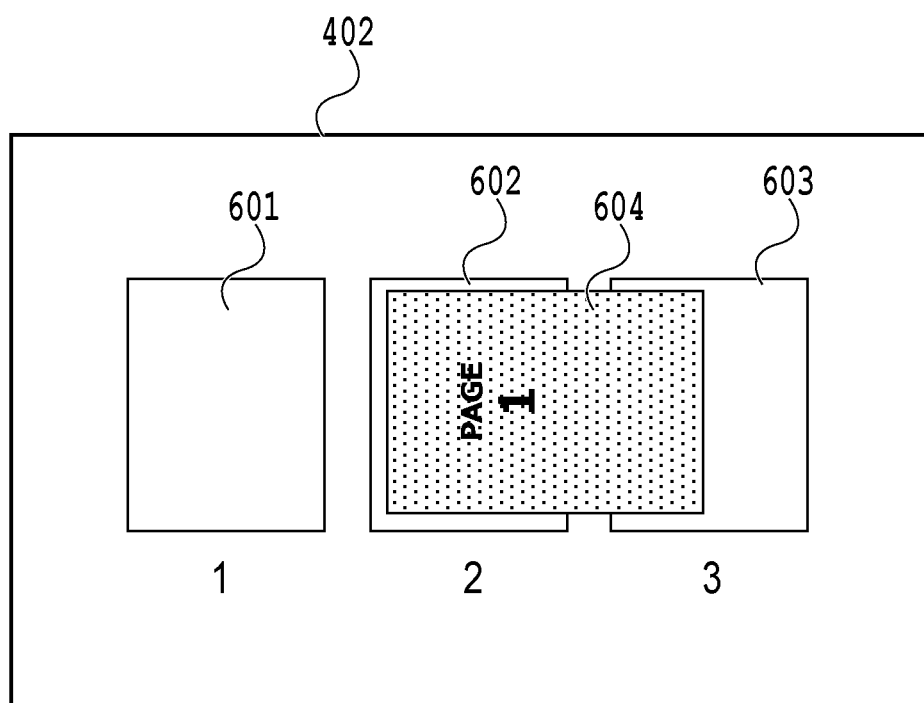
FIG. 6 is a diagram illustrating an image object and a parent sheet region.

FIG. 6 is a diagram where sheet regions and an image object are displayed on the preview part 402. Using FIG. 6, the items of the layout information on an image object shown in FIG. 5B are described. Layout information on an image object has the following information: a parent sheet region, a position relative to the parent sheet region, the orientation of the image object, the width of the image object, and the height of the image object. The parent sheet region is information indicating the sheet region to which the image object belongs, and every image object belongs to one of sheet regions.

In FIG. 6, sheet regions 601, 602, and 603 and an image object 604 are placed on the preview part 402. Even in a case when the image object is placed to lie on both the page-2 sheet region 602 and the page-3 sheet region 603 as shown in FIG. 6, one parent sheet region can be determined for the image object. In a case like the one above where an image object is placed to lie on a plurality of sheet regions, layout control performed in moving the image object can be performed in more details by making the image object belong to one of sheet regions. A flowchart for determining a parent sheet region for an image object will be described later with FIG. 10. Although an image object is displayed irrespective of whether the image object is inside or outside a sheet region in the present embodiment, a region of the image object outside the parent sheet region may be not displayed or displayed semi-transparently. Displaying a region of an image object outside the parent sheet region differently allows a user to visually recognize the sheet region to which the image object belongs.

Referring back to FIG. 5B, a position relative to the parent sheet region indicates the position of the upper left coordinates of the image object on the parent sheet region, and the position where the image object is displayed on the preview part 402 is determined based on the value of the coordinates of the "position relative to the parent sheet region." The orientation of the image object indicates the orientation in which the image object is placed, and is changed in a case when an operation of changing the orientation of the image object is performed in the edit toolbar part 401. The width of the image object and the height of the image object indicate the horizontal and vertical lengths of the image object, respectively, and are used, along with the position on the sheet region, in displaying the image object on the preview part 402.

Note that FIGS. 5A and 5B are diagrams showing examples of layout information, and items actually stored are not limited to these examples. For example, the layout information on a sheet region in FIG. 5A is formed by the information: "an index for the sheet region," "the position of the sheet region," "sheet orientation," "sheet width," and "sheet height." However, different pieces of information may be stored as long as the layout information uniquely determines the drawing position or region of the sheet region. Note that, the layout information is managed for each sheet region and each image object. Thus, in an example where there are six sheet regions and six image objects, the storage unit 306 manages six pieces of layout information on the sheet regions and six pieces of layout information on the image objects.

<Moving an Image Object>

As described earlier, an image object displayed on the preview part 402 can be moved by a user operation, and the layout information is updated after the layout controlling unit 303 of the image processing software 300 performs movement processing. Details of this image object moving processing are described using FIG. 7. Note that to simplify descriptions, the following description assumes that a unit on the coordinate system is one pixel, and 1 mm is displayed as one pixel.

Figure 7:
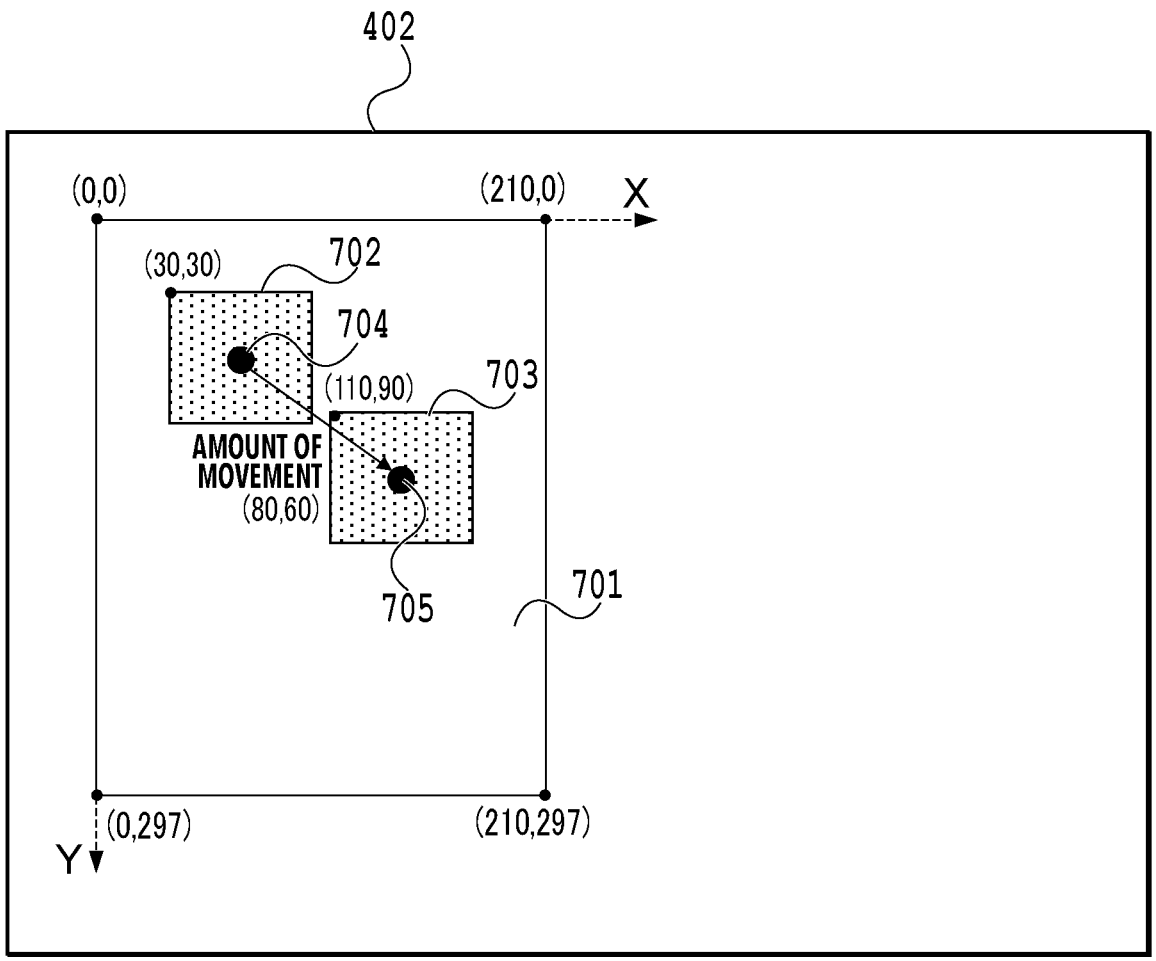
FIG. 7 is a diagram illustrating image object moving processing.

FIG. 7 is a diagram illustrating movement processing for moving an image object. FIG. 7 shows a state where a sheet region 701 and an image object 702 are placed on the preview part 402, and a rectangular region 703 indicates the post-move position of the image object 702. Note that, in FIG. 7, X represents the horizontal direction and Y represents the vertical direction, and coordinates on the preview part 402 are represented as (X, Y). The sheet region 701 is a sheet region which is 210 mm in width and 207 mm in length. The sheet region 701 is represented by a rectangular region having coordinates (0, 0), (0, 297), (210, 297), and (210, 0) on the preview part 402 as its vertices. The image object 702 is an image object which is 30 mm in width and height and placed at the position of coordinates (30, 30) on the preview part 402. A point 704 indicates the start point of a drag operation on the image object 702 performed by a user, and a point 705 indicates the end point of the drag operation.

For instance, once a user clicks on the coordinates (60, 60) inside the region of the image object 702, the image object 702 is selected. Next, in response to a drag operation performed by a user, the image processing software 300 obtains the drag start and end positions using the UI controlling unit 302. Using the drag start and end positions obtained by the UI controlling unit 302, the amount of movement of the image object 702 can be calculated as follows.

$$\text{Amount of movement } (x,y)=(X_E-X_B, Y_E-Y_B) \quad \text{Formula (1)}$$

In Formula (1), $X_B$ and $Y_B$ are the x-coordinate and the y-coordinate of the start position of the drag operation, respectively, and $X_E$ and $Y_E$ are the x-coordinate and the y-coordinate of the end position of the drag operation, respectively. In a case when the start position of the drag operation is coordinates (60, 60) and the end position of the drag operation is coordinates (140, 120), calculation of Formula (1) yields an amount of movement of (+80, +60). Thus, the image processing software 300 moves the position of the image object by +80 horizontally and +60 vertically.

As a result, as shown in FIG. 7, the image object 702 moves from the position of the coordinates (30, 30) to the position of the coordinates (110, 90) in terms of the upper left coordinate values on the preview part 402, and the image processing software 300 updates the position coordinates of the image object using the layout controlling unit 303.

As an alternative configuration, in the event of the above-described drag operation on the image object, a temporary movement amount may be determined by detection of the mouse cursor position during the drag to display, on the preview part 402, a ghost image representing the temporary location to which the image object is moved. There is no limitation as to the presentation of the ghost image, and a rectangle or an image object changed in transparency may be displayed as a ghost image.

Figure 8:
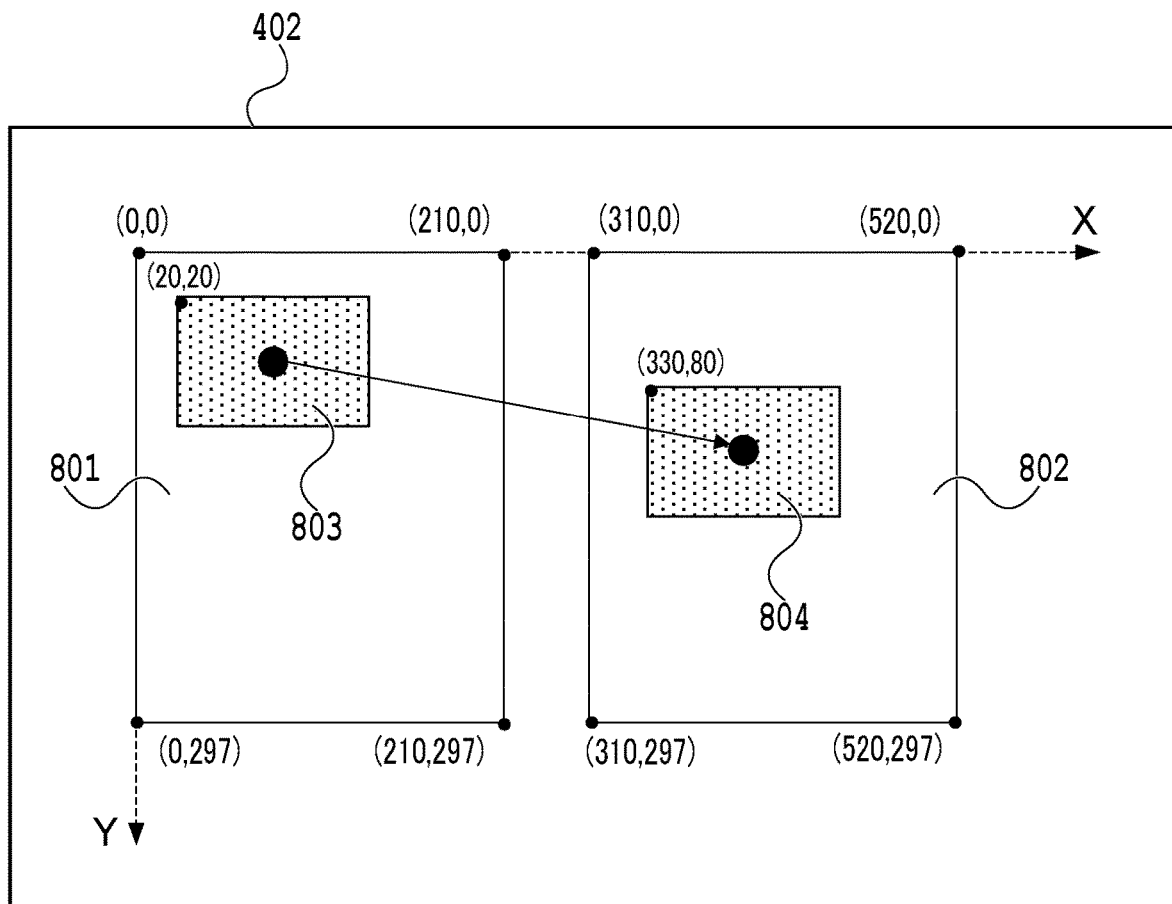
FIG. 8 is a diagram illustrating image object moving processing involving changing a parent sheet region.

FIG. 8 is a diagram showing processing for moving an image object displayed on the preview part 402 and placed on a sheet region. Using FIG. 8, a description is given of image object movement involving a change in its parent sheet region. In FIG. 8, a sheet region 801 and a sheet region 802 are on the preview part 402. The sheet region 801 represents a sheet which is 210 mm in width and 297 mm in length and that has the following coordinates on the preview part 402 as its vertices: (0, 0), (0, 297), (210, 297), and (210, 0).

Similarly, the sheet region 802 represents a sheet which is 210 mm in width and 297 mm in length and that has the following coordinates on the preview part 402 as its vertices: (310, 0), (310, 297), (520, 297), and (520, 0). An image object 803 is placed on the sheet region 801, and its position relative to the sheet region 801 is the coordinates (20, 20) on the preview part 402. For example, in a case when a user clicks on the coordinates (50, 50) on the preview part 402, the image object 803 is selected because the coordinates (50, 50) is inside the region of the image object 803. Next, a user performs a drag operation. In a case when the start position and the end position of the drag operation are the coordinates (50, 50) and (360, 110), respectively, the amount of movement of the image object 803 is (+310, +60) as a result of calculation of Formula (1). The layout controlling unit 303 moves the position of the image object 803 by +310 horizontally and +60 vertically, so that the post-move position of the image object 803 relative to the sheet region 801 is the coordinates (330, 80). The post-move image object 803 is at the position of a rectangular region 804 as shown in FIG. 8.

Note that, in the event of moving an image object, the position of the image object relative to its parent sheet region is determined in order to store the post-move coordinates of the image object in the storage unit 306 as layout information. In the example in FIG. 8, the upper left coordinates of the sheet region 802 is (310, 0), and the position of the image object 803 relative to the sheet region 802 is (20, 80). This value is stored as layout information.

As shown in FIG. 8, in the event where the image object 803 is moved from the sheet region 801 to the sheet region 802, the following items are updated in image layout information after the movement: "parent sheet region" and "position relative to the parent sheet region." Thus, the layout controlling unit 303 updates the parent sheet region and the position coordinates of the image object in the layout information on the image object 803 stored in the storage unit 306. In the case in FIG. 8, assuming that the sheet region index for the sheet region 801 is 1 and the sheet region index for the sheet region 802 is 2, the parent sheet region of the image object 803 is changed from 1 to 2.

FIG. 9 is a diagram showing layout information changed by the movement processing in the example in FIG. 8. As described above, "parent sheet region" and "position relative to the parent sheet region" on the image object 803 are changed as shown in the table in FIG. 9.

Figure 10:
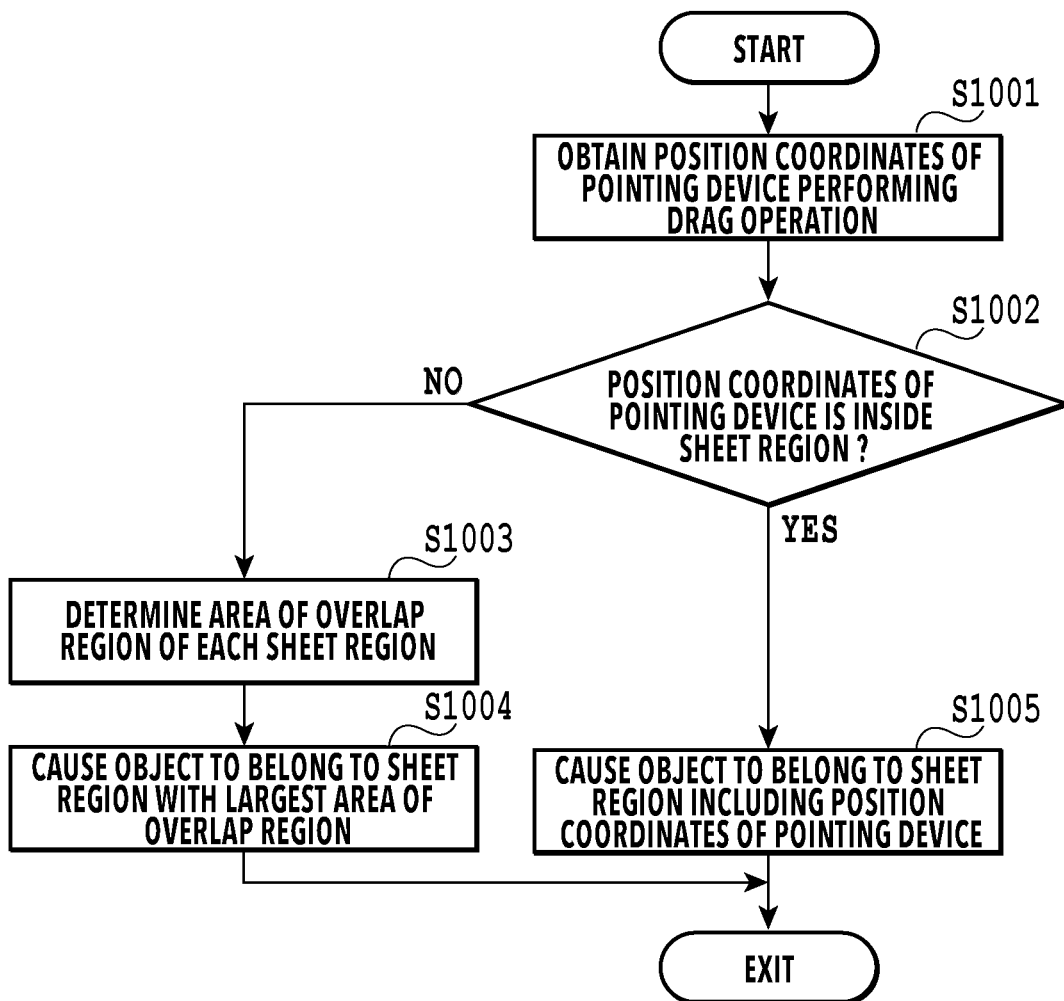
FIG. 10 is a diagram showing a flowchart of processing for determining the parent sheet region of an image object.

Next, using FIG. 10, a description is given of how the parent sheet region of an image object is determined in the event of moving the image object.

FIG. 10 is a diagram showing a flowchart for determining the parent sheet region of an image object. This flowchart is started in response to a user performing an operation of selecting an image object inside a sheet region. Note that the processing in each step in FIG. 10 is performed by the image processing software 300 in the CPU 211 of the host computer 201 by loading program code stored in the ROM 212 into the RAM 213 and executing the program code. Also, a letter "S" used in the descriptions of processing indicates that it is a step in the flowchart.

First, in S1001, the image processing software 300 obtains the position coordinates of the cursor of the mouse performing a drag operation at a parent sheet region determination timing. Next, in S1002, the image processing software 300 determines whether the position coordinates of the cursor of the mouse, which is a pointing device, is within any one of sheet regions placed on the preview part 402 in FIG. 4. If it is determined that the position coordinates of the mouse cursor is inside a sheet region, processing proceeds to S1005, and, if the position coordinates of the mouse cursor is outside a sheet region, processing proceeds to S1003. In S1005, the image processing software 300 makes the image object belong to the sheet region in which the position coordinates of the mouse cursor exists, and ends the flowchart. Note that, in a case when there is no change in the parent sheet region before and after movement, the layout information does not need to be updated.

In S1003, the image processing software 300 determines the amount of movement of the image object based on the drag operation start position and the current mouse cursor position coordinates, and determines the area of an overlap region between the sheet region and the post-move image object. The area determination is performed as many times as the number of sheet regions with which the post-move image object overlaps. In S1004, the image processing software 300 determines that a sheet region whose overlap region has the largest area among those determined in S1003 is the parent sheet region for the image object, and ends the flowchart.

Note that, in a case when the areas of the overlap regions determined in S1003 are all the same or in a case when the post-move image object overlaps with none of the sheet regions, a sheet region with the smallest distance to the mouse cursor position coordinates may be selected. Other possible configurations include selecting a sheet region with the smaller or smallest index or cancelling the movement processing.

Figure 11:
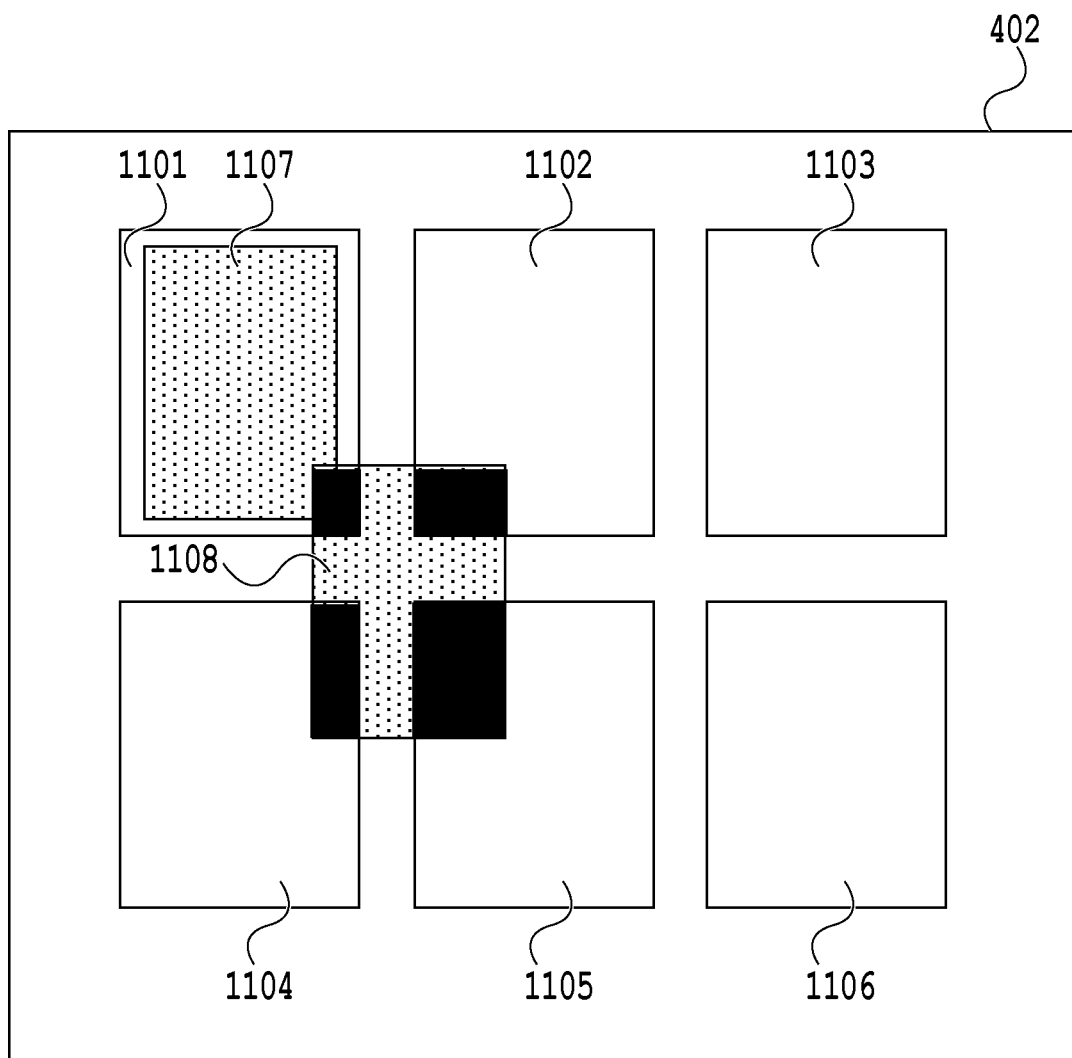
FIG. 11 is a diagram illustrating the processing for determining the parent sheet region of an image object.

FIG. 11 is a diagram illustrating the processing for determining the parent sheet region of an image object. Using FIG. 11, a description is given of an example of the above-described parent sheet region determination processing performed in a case when an image object is moved. In FIG. 11, there are six sheet regions, and an image object 1107 is placed on the sheet region 1101. A case is discussed here where, as shown in FIG. 11, a user selects the image object 1107 and moves, through a drag operation, the image object 1107 to the position of a rectangular region 1108, overlapping with the sheet regions 1101, 1102, 1104, and 1105. In this case, the CPU 211 determines the areas by which the image object 1107 overlaps with the respective sheet regions 1101, 1102, 1104, and 1105.

Figure 12:
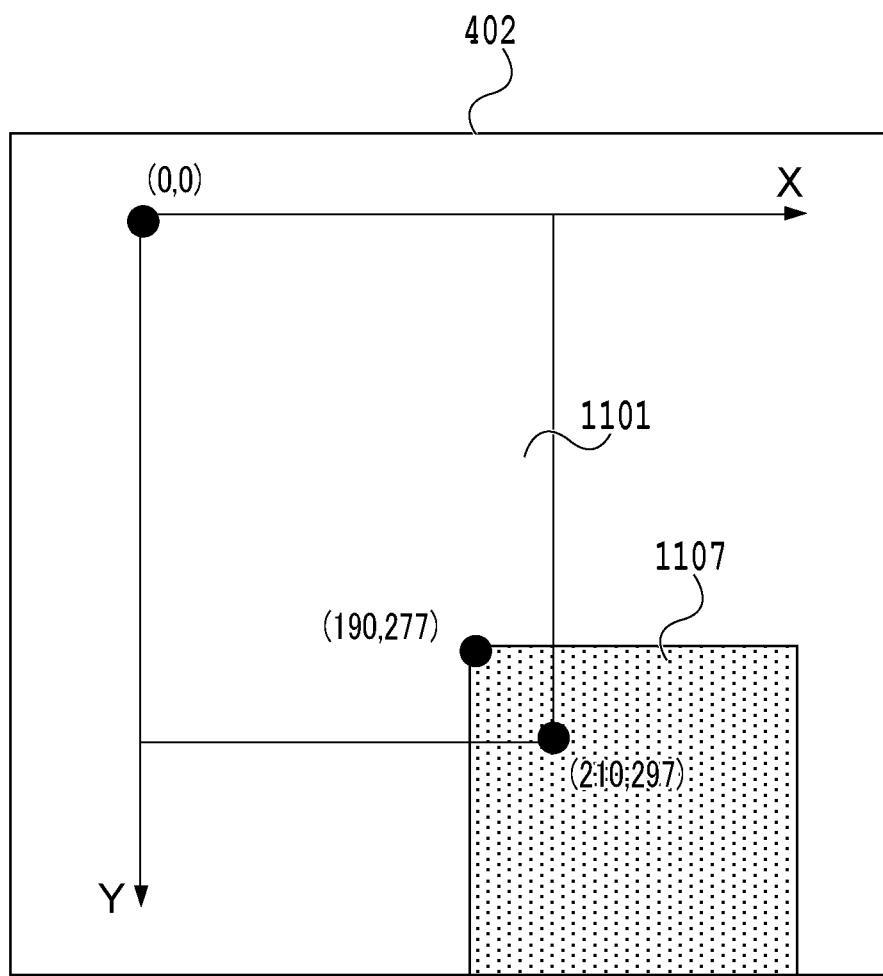
FIG. 12 is a diagram illustrating details of the processing for determining the parent sheet region of an image object.

FIG. 12 is a diagram showing the image object 1107, the sheet region 1101, and the area of an overlap therebetween. In the arrangement in FIG. 12, the overlap area between the image object 1107 and the sheet region 1101 is found by the following formula.

$$\text{Overlap area} = (X_b - X_a)(Y_b - Y_a) \quad \text{Formula (2)}$$

In Formula (2), $X_a$ and $Y_a$ represent the x-coordinate and the y-coordinate of the upper left coordinates of the post-move image object 1107, and $X_b$, $Y_b$ represent the x-coordinate and the y-coordinate of the lower right coordinates of the sheet region 1101. Assuming that the lower right coordinates of the sheet region 1101 are (210, 297) and the upper left coordinates of the post-move image object 1107 are (190, 277) as shown in FIG. 12, the overlap area is 400 based on Formula (2).

The overlap areas between the image object 1107 and the respective sheet regions 1102, 1104, and 1105 are determined similarly, and a sheet region with the largest overlap area is determined from these sheet regions. In FIG. 11, the sheet region 1105 has the largest area of overlap with the image object 1107, and, therefore, based on the determination in S1004 in FIG. 10, the parent sheet region of the image object 1107 after the image object 1107 moves to the position of the rectangular region 1108 is the sheet region 1105.

As thus described, the parent sheet region of an image object is determined based on the mouse cursor position coordinates and the post-move position of the image object. This makes it possible to determine a parent sheet region more intuitively and naturally in response to a user operation.

<Moving a Plurality of Image Objects>

Next, a description is given of moving a plurality of image objects. A user can select image objects on different sheets and issue an instruction to move them at once. To move a plurality of image objects, the image processing software 300 switches between image object layout control methods according to the pre-move positions of the image objects to be moved and the locations to which they are moved. Using FIG. 13, a description is given of how to determine the layout control method.

Figure 13:
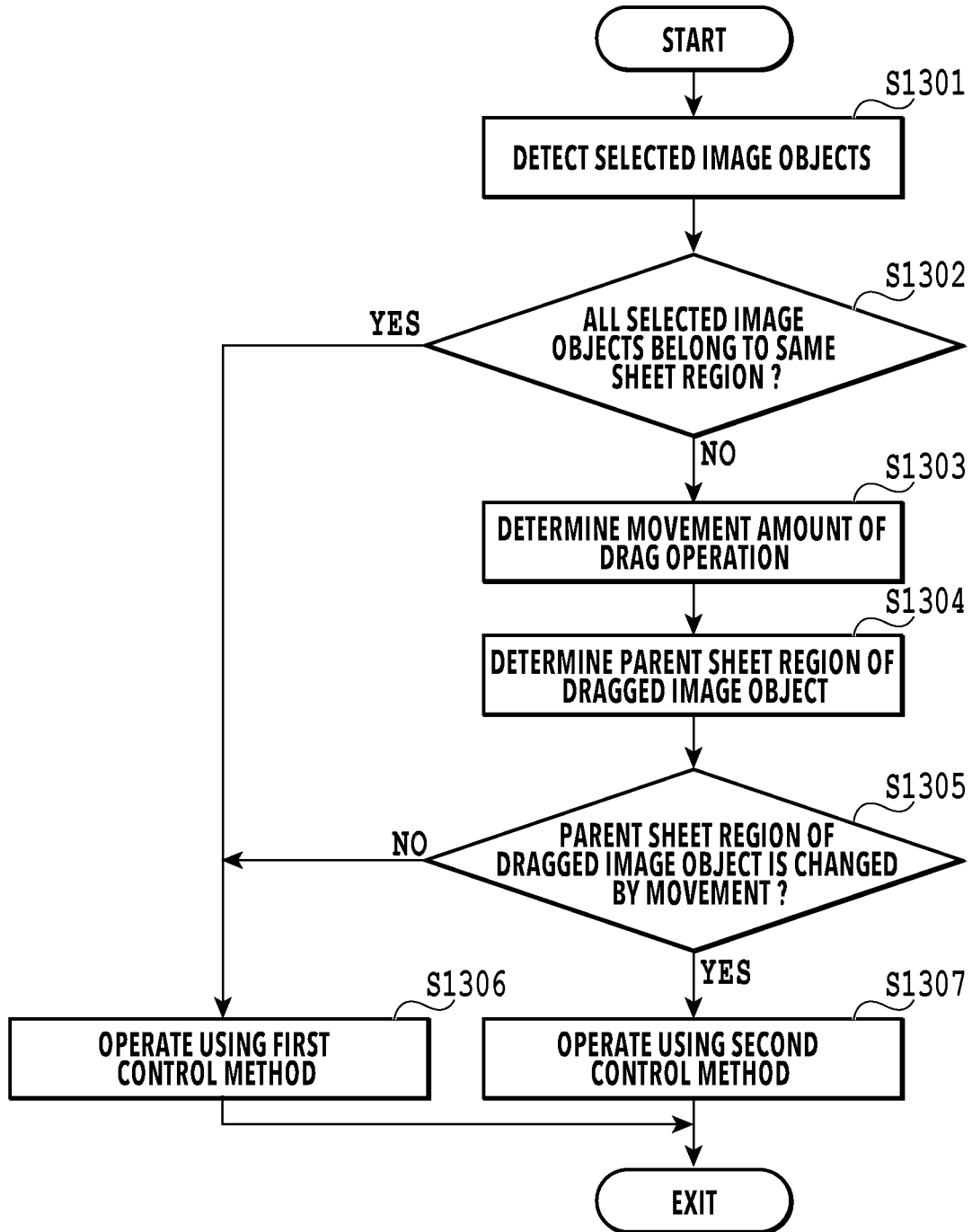
FIG. 13 is a diagram showing a flowchart of determining a control method to employ in moving a plurality of image objects.

FIG. 13 is a diagram showing a flowchart of a layout control method performed in moving a plurality of image objects. This flowchart is started in response to a user performing an operation of selecting image objects inside sheet regions. Note that the processing in each step in FIG. 13 is performed by the image processing software 300 in the CPU 211 of the host computer 201 by loading program code stored in the ROM 212 into the RAM 213 and executing the program code. Also, a letter "S" used in the descriptions of processing indicates that it is a step in the flowchart.

First, in S1301, the image processing software 300 detects selected image objects and the parent sheet regions of the image objects. Next, in S1302, the image processing software 300 determines whether the parent sheet regions of the selected image objects are all the same. If the parent sheet regions of the selected image objects are all the same, processing proceeds to S1306, and, if at least one of the parent sheet regions of the selected image objects is different, processing proceeds to S1303.

In S1303, the image processing software 300 determines the amount of movement of the image objects based on the user's drag operation. Next, in S1304, the image processing software 300 determines the parent sheet region of the dragged image object after the movement based on the amount of movement determined in S1303. A dragged image object is, among the plurality of selected image objects, an image object where the start point of a user operation using a pointing device exists. Note that the determination of the amount of movement of the image objects or the determination of the parent sheet region of the image object may be done using the methods described with FIGS. 8, 10, or the like.

Next, in S1305, the image processing software 300 determines whether the parent sheet region of the dragged image object changes before and after the movement. If the parent sheet region of the dragged image object changes before and after the movement, processing proceeds to S1307, and, if the parent sheet region of the dragged image object does not change before and after the movement, processing proceeds to S1306.

In S1306, the image processing software 300 executes a first control method in which image object moving processing is performed while maintaining the positional relation between the image objects, and ends the flowchart. By contrast, in S1307, the image processing software 300 executes a second control method in which image object moving processing is performed without maintaining the positional relation between the image objects, and ends the processing. Details of the first control method and the second control method will be given later.

Note that it is preferable to perform the processing from S1303 to S1307 in FIG. 13 constantly during the drag of the image objects and display ghost images of all the image objects selected to be moved to indicate the locations to which they are moved. This processing allows a user to imagine during the drag operation how the image objects will be placed and therefore improves user convenience.

<First Control Method>

Figure 14:
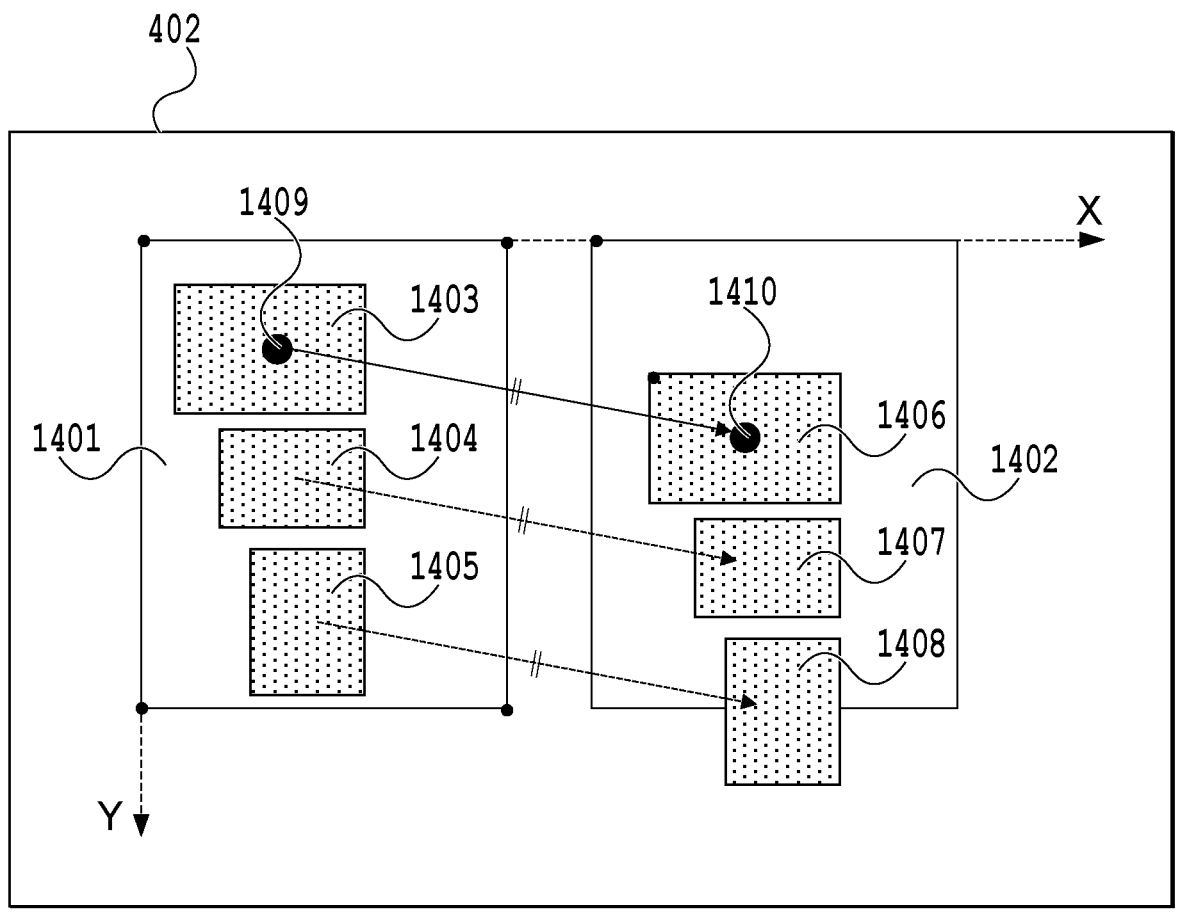
FIG. 14 is a diagram illustrating processing performed in moving a plurality of image objects.
Figure 15:
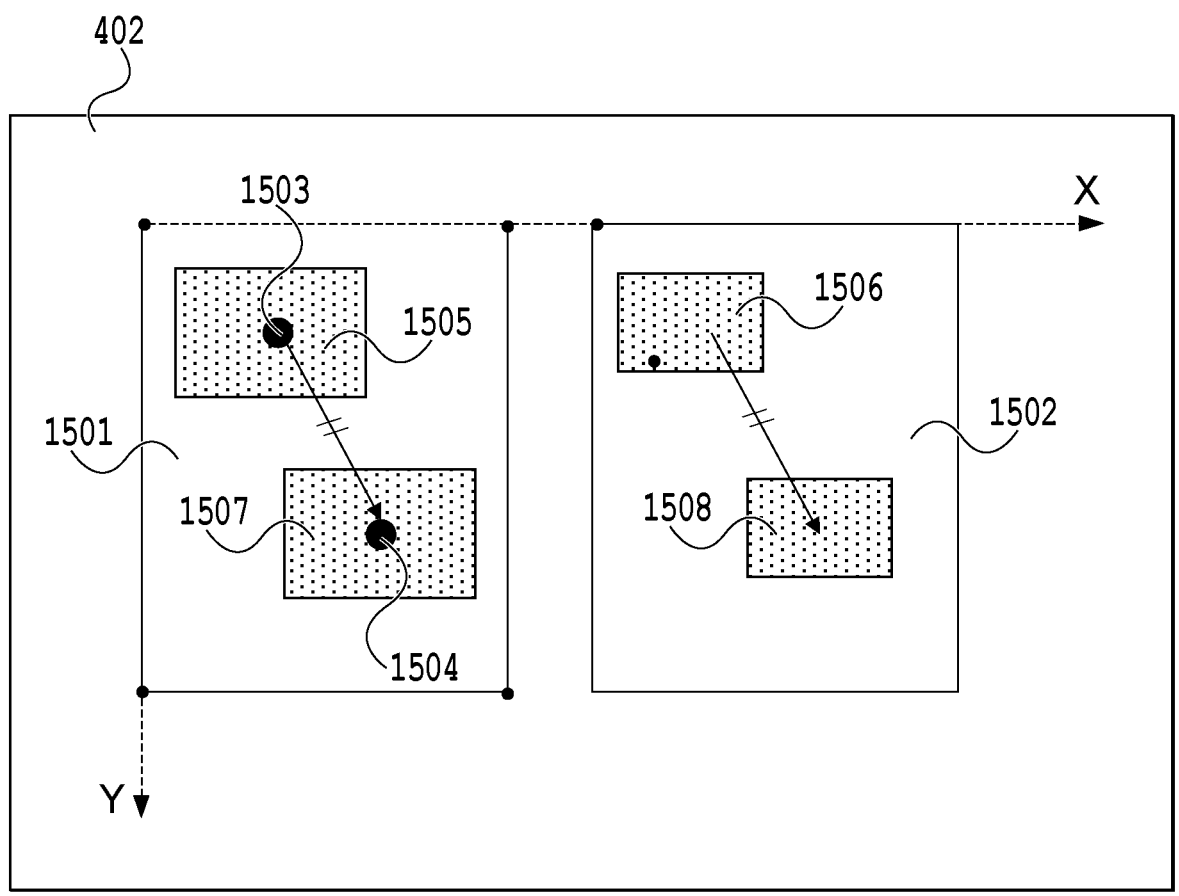
FIG. 15 is a diagram illustrating processing performed in moving a plurality of image objects.

Next, the first control method described with FIG. 13 is described using examples in FIGS. 14 and 15.

FIG. 14 is a diagram illustrating processing for moving a plurality of selected image objects. Specifically, FIG. 14 shows an example of how a plurality of selected image objects are moved in a case when the image objects all belong to the same sheet region. In FIG. 14, sheet regions 1401 and 1402 are placed on the preview part 402, and image objects 1403, 1404, and 1405 are placed on the sheet region 1401. Since these image objects all belong to the same sheet region, the layout controlling unit 303 moves the image objects using the first control method, as described earlier.

In the first control method, in a case when a user selects a plurality of image objects and instructs that the objects be moved, the plurality of selected image objects are moved while maintaining their positional relation. Specifically, based on the amount of movement determined in S1303 in FIG. 13, all the selected image objects are moved by the same amount of movement. In the case in FIG. 14, a user selects the image objects 1403, 1404, and 1405 and performs an operation of dragging a point 1409 on the image object 1403 to a point 1410, the image object 1403 thus being a dragged image object. In response to the image object moving instruction, the layout controlling unit 303 moves the image objects 1403, 1404, and 1405 by the amount of movement to the positions of rectangular regions 1406, 1407, and 1408, respectively, while maintaining their positional relations. In this event, the parent sheet regions of the respective image objects thus moved are updated to the page-2 sheet region 1402.

Since the image objects 1403, 1404, and 1405 are moved by the same amount of movement while maintaining their positional relation, the amount of movement may be calculated only for, for example, 1403, and the movement amount thus determined may be used as the movement amounts for 1404 and 1405 as well. Also, in a case when an image object is placed outside a sheet region after being moved, its position may be adjusted to be inside the sheet region. In this case, it is preferable to display the post-adjustment position as a ghost image during the drag operation.

Next, using FIG. 15, a description is given of an example of how the first control method is selected based on conditional branching in S1305.

FIG. 15 is a diagram illustrating processing for moving a plurality of selected image objects. Specifically, FIG. 15 shows an example of how a plurality of selected image objects are moved in a case when the parent sheet region of a dragged image object 1505 does not change before and after the movement. The following description assumes that in FIG. 15, the parent sheet region of an image object (an image object 1506), which is other than the dragged image object and selected at the same time as the dragged image object, does not change before and after movement either.

In FIG. 15, sheet regions 1501 and 1502 are placed on the preview part 402, and the image object 1505 and an image object 1506 are placed on the sheet region 1501 and the sheet region 1502, respectively. In response to a user selecting the image objects 1505 and 1506 and performing an operation of dragging a point 1503 on the image object 1505 to a point 1504, the layout controlling unit 303 performs image object moving processing. According to the determination based on the conditional branching in S1302, the image object 1505 and the image object 1506 belong to different sheet regions, and, therefore, processing from S1303 to S1305 is performed. Since the parent page of the dragged image object does not change after the movement in FIG. 15, the moving processing is performed using the first control method in accordance with the determination in the conditional branching in S1305.

As a result of the moving processing using the first control method, the layout controlling unit 303 moves the image object 1505 and the image object 1506 to the positions of rectangular regions 1507 and 1508, respectively, while maintaining the positional relation between the objects.

As thus described, in a case of moving a plurality of image objects belonging to the same parent sheet region before movement to another sheet region, layout control is performed using the first control method in which they are moved while maintaining their positional relation. Thus, image object movement involving a sheet change can be done with the user's edit results maintained as much as possible.

<Second Control Method>

Figure 16:
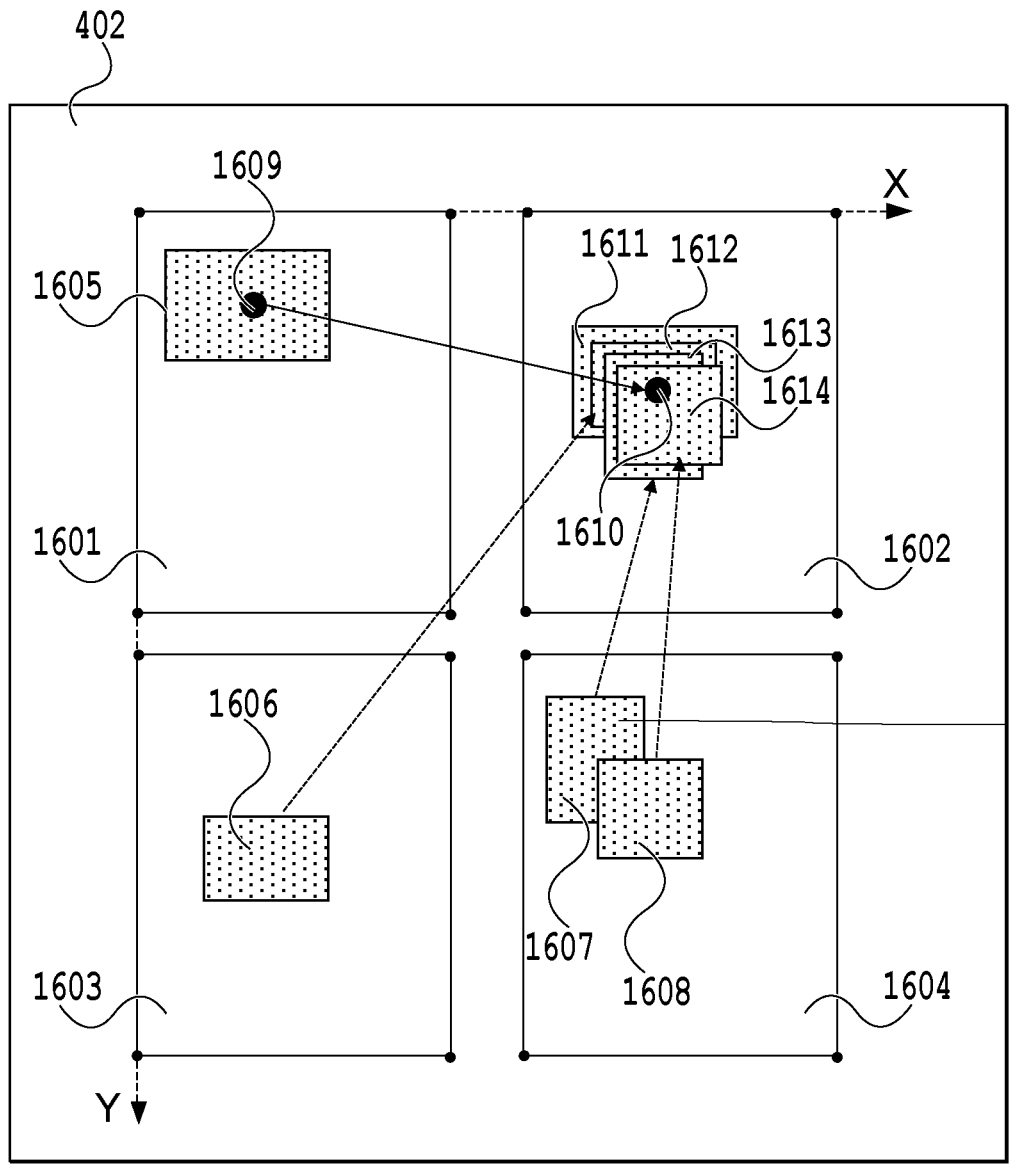
FIG. 16 is a diagram illustrating gathering processing performed in moving a plurality of image objects.

FIG. 16 is a diagram illustrating processing for moving a plurality of selected image objects. Specifically, FIG. 16 illustrates a control method performed in a case when a plurality of image objects belonging to different sheet regions are gathered onto one sheet region (i.e., the second control method). In the second control method, a plurality of selected image objects are moved without maintaining their positional relation. In FIG. 16, sheet regions 1601, 1602, 1603, and 1604 are placed on the preview part 402. Also, an image object 1605 is placed on the sheet region 1601, an image object 1606 is placed on the sheet region 1603, and an image object 1607 and an image object 1608 are placed on the sheet region 1604. For instance, a user selects the image objects 1605, 1606, 1607, and 1608 and performs an operation of dragging a point 1609 on the image object 1605 to a point 1610 on the sheet region 1602.

As a result, the layout controlling unit 303 moves the image objects 1605, 1606, 1607, and 1608 to the sheet region 1602 without maintaining the positional relations among the image objects. In FIG. 16, four image objects to be moved are placed in a stacking manner. Placing the image objects in a stacking manner has the merit of being able to gather the image objects onto a sheet region designated by the user while maintaining the sizes of the image objects. For example, the stacking order may be determined based on the indices of the sheet regions to which the image objects belong before movement and the front and back arrangement relation between the image objects before movement. Note that the stacking order determination method is not limited to the above. For example, the image objects may be placed from the back to the front in the descending order of the size or area of the image objects.

In FIG. 16, the values of the indices of the sheet regions are, from the smallest to the largest, the sheet regions 1601, 1602, 1603, and 1604. The order in which to stack the image objects belonging to them is determined based on this order. Specifically, the image object 1605 belonging to the sheet region 1601 is placed at the back, and, then, the rest of the image objects are placed thereon in the following order: the image object 1606 belonging in the sheet region 1603, the image object 1607 belonging in the sheet region 1604, and the image object 1608 belonging in the sheet region 1604. Since the image object 1607 and the image object 1608 belong to the same sheet region, their stacking order is determined based on their front and back relation before movement. In the example in FIG. 16, the image object 1607 is placed at the back of the image object 1608.

Based on the order thus determined, the layout controlling unit 303 places the image objects 1605, 1606, 1607, and 1608 at the positions of rectangular regions 1611, 1612, 1613, and 1614, respectively, in a stacking manner. The stacking order of the image objects is, from the back to the front, the image object 1605, the image object 1606, the image object 1607, and the image object 1608. The image objects placed in a stacking manner are then moved to a given position inside the sheet region 1602 based on a user operation. Presenting ghost images is effective also in the case of moving image objects using the second control method. Also, to make the front and back relation between the image objects clear, drop shadows may be added to represent the depths by adding shadows to the ghosts.

As another example of the second control method in which a plurality of image objects are moved without maintaining their positional relation, the image objects may be arranged automatically within a single sheet region.

Figure 17:
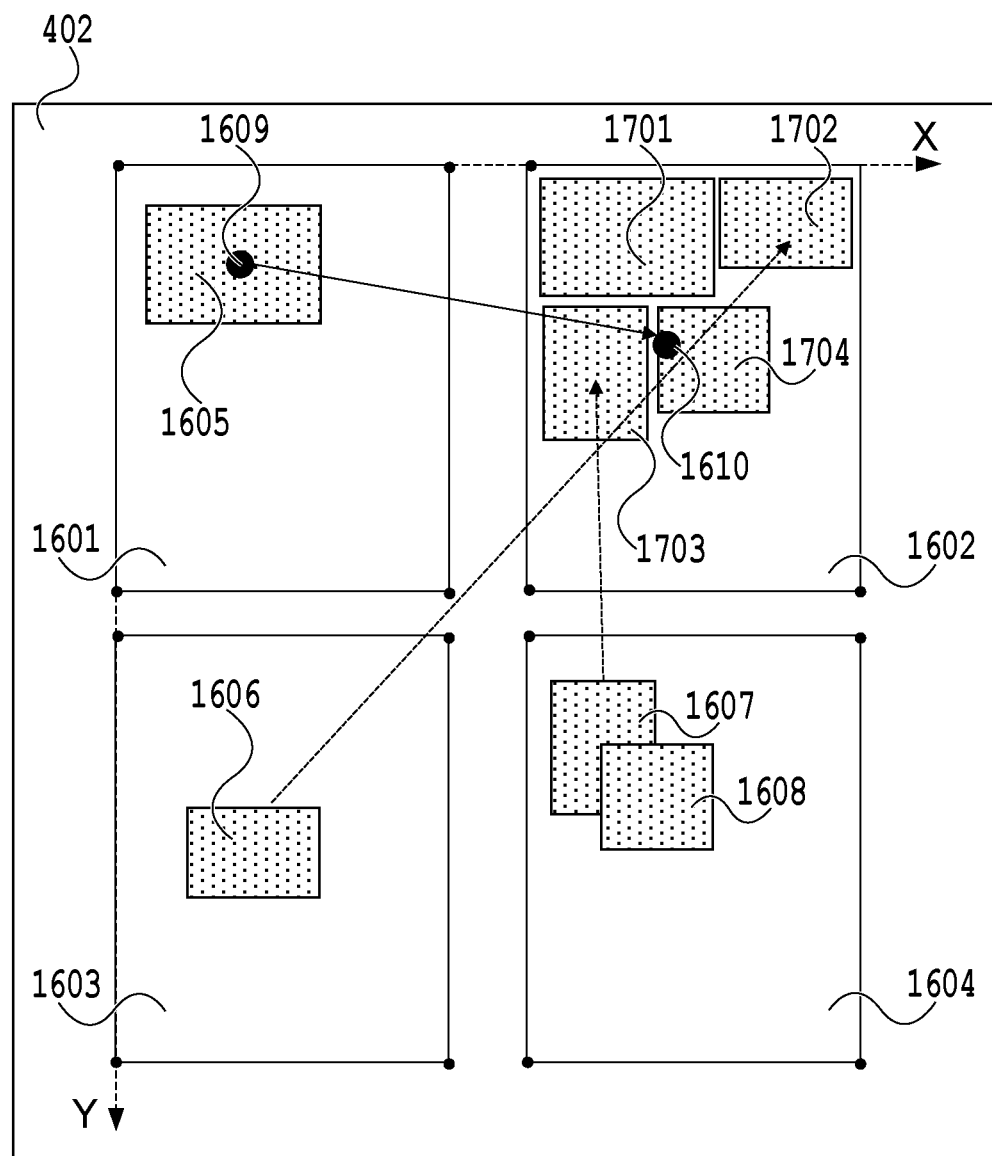
FIG. 17 is a diagram illustrating automatic arrangement processing performed in moving a plurality of image objects.

FIG. 17 shows a screen where the image objects 1605, 1606, 1607, and 1608 in FIG. 16 are moved to the sheet region 1602 using automatic arrangement. In automatic arrangement, the image objects are placed on a sheet region with no overlaps between them, thus providing the merit of better visibility. Also, in a case when the image objects automatically arranged are placed as desired by the user, automatic arrangement can save the user from performing operations of moving the image objects again inside the sheet region. Note that, in automatic arrangement, automatic size adjustment processing is performed as needed to make the image objects fit in the sheet region, and processing may be performed such that only an object that does not fit in the sheet region is placed in a stacking manner. The method for the automatic arrangement is not limited to any particular method. Examples of possible methods include arranging and placing image objects on a sheet region so that they do not overlap with each other based on the order of sheet regions to which the image object belong before movement and the front and back relation between the image objects before movement.

In response to a user performing an operation of moving image objects, the processing in S1307 in the flowchart in FIG. 13 is performed, and the image processing software 300 automatically arranges the image objects on the move-destination sheet region. As a result of the automatic arrangement, the image objects 1605, 1606, 1607, and 1608 are moved to the positions of rectangular regions 1701, 1702, 1703, and 1704, respectively. Note that, in the case of performing automatic arrangement, as is similar to the case of placing image objects in a stacking manner, it is preferable to present ghosts during a drag operation to make it easier for a user to imagine how the image objects will be placed after the automatic arrangement.

Further, in the event of controlling image objects using the second control method, an image object whose parent sheet region does not change before and after movement may be excluded from image object gathering and maintain the pre-move position. An example is described using FIG. 18.

Figure 18:
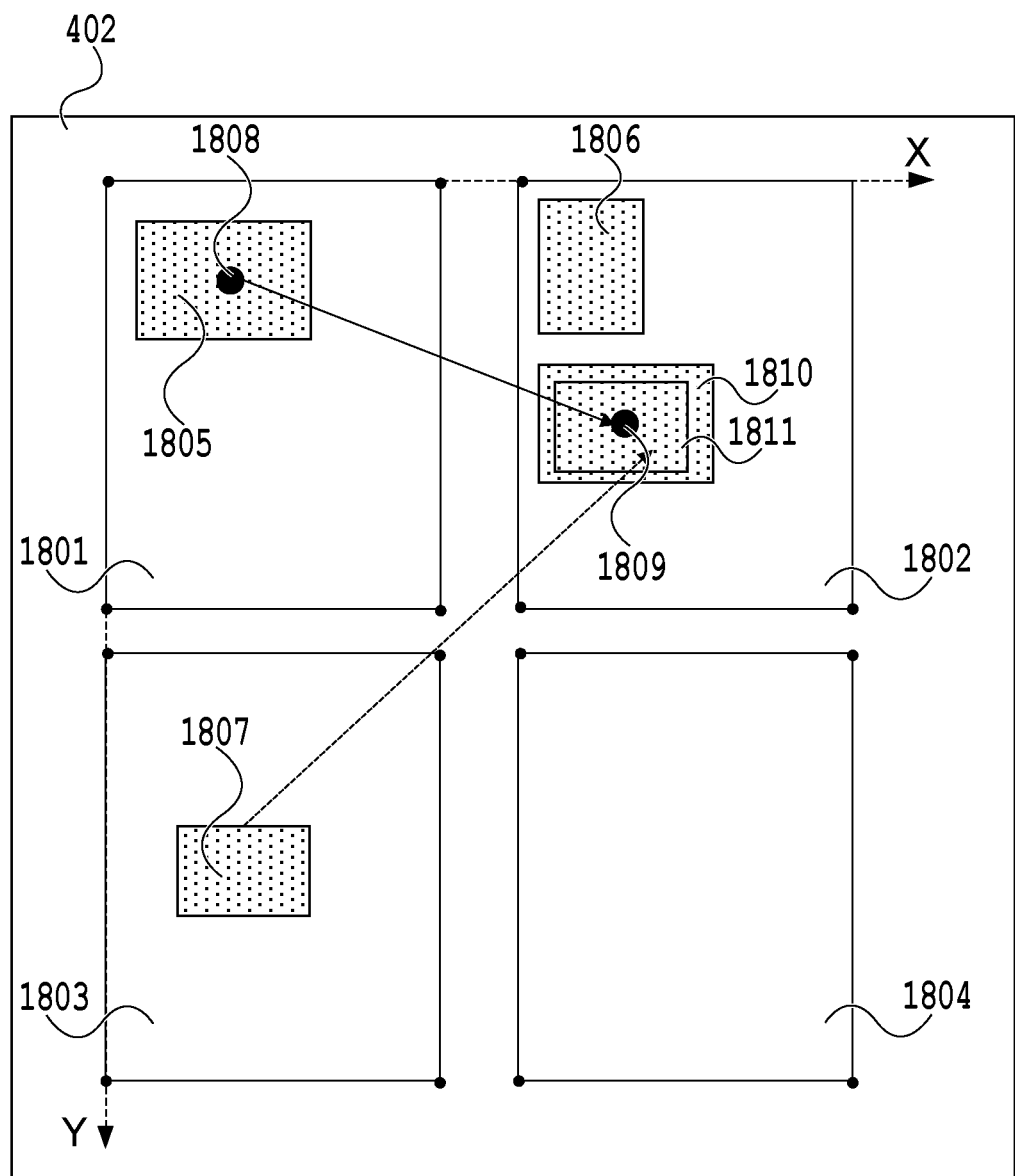
FIG. 18 is a diagram supplementarily illustrating gathering processing performed in moving a plurality of image objects.

FIG. 18 is a diagram giving a supplementary description of the gathering processing performed in moving a plurality of image objects. Specifically, FIG. 18 illustrates image object moving processing performed in a case when a plurality of image objects that have different parent sheet regions and that are to be gathered onto one sheet region include an image object whose parent sheet region does not change before and after movement.

In FIG. 18, sheet regions 1801, 1802, 1803, and 1804 are placed on the preview part 402. Also, an image object 1805 is placed on the sheet region 1801, an image object 1806 is placed on the sheet region 1802, and an image object 1807 is placed on the sheet region 1803. A user selects the image objects 1805, 1806, and 1807 and performs an operation of dragging them from a point 1808 on the image object 1805 to a point 1809 on the sheet region 1802.

As a result, the layout controlling unit 303 places the image objects 1805 and 1807 whose parent sheet regions change before and after movement onto the sheet region 1802 in a stacking manner. Meanwhile, the layout controlling unit 303 maintains the pre-move position of the image object 1806 whose parent sheet region does not change before and after movement. In other words, as shown in FIG. 18, the layout controlling unit 303 moves the image object 1805 to the position of a rectangular region 1810 and the image object 1807 to the position of a rectangular region 1811 and does not change the position of the image object 1806. Note that, in a case when the three image objects are selected and dragged from the point 1808 on the dragged image object 1805 to anywhere inside the sheet region 1801 (i.e., the same parent sheet region) in FIG. 18, the three images are moved using the first control method.

As thus described, the present embodiment aims to improve the usability in gathering of a plurality of image objects. Specifically, the control method can be switched depending on how the parent sheet regions of a plurality of image objects change before and after they are moved, the control method including whether to maintain the pre-move positional relation between the image objects. Only by selecting and moving image objects, a user can intuitively perform a gathering operation and a moving operation maintaining the positional relation between the image objects, and also benefits from improved convenience because the image object gathering operation has fewer steps than before. Also, showing how image objects will be placed after they are moved using presentation of ghosts while the image objects are being dragged and moved makes it easier for a user to imagine the layout resulting from moving the image objects.

Embodiment 2

The present embodiment describes a method for switching a control method performed in moving a plurality of image objects, based on a different condition from that in Embodiment 1. Specifically, in a case of moving a plurality of image objects on the same sheet region, the control method is switched depending on whether there is an image object that will be placed outside the sheet region after being moved. The following mainly describes processing different from that in Embodiment 1, omitting descriptions of configurations and processing that are the same as those in Embodiment 1.

Figure 19:
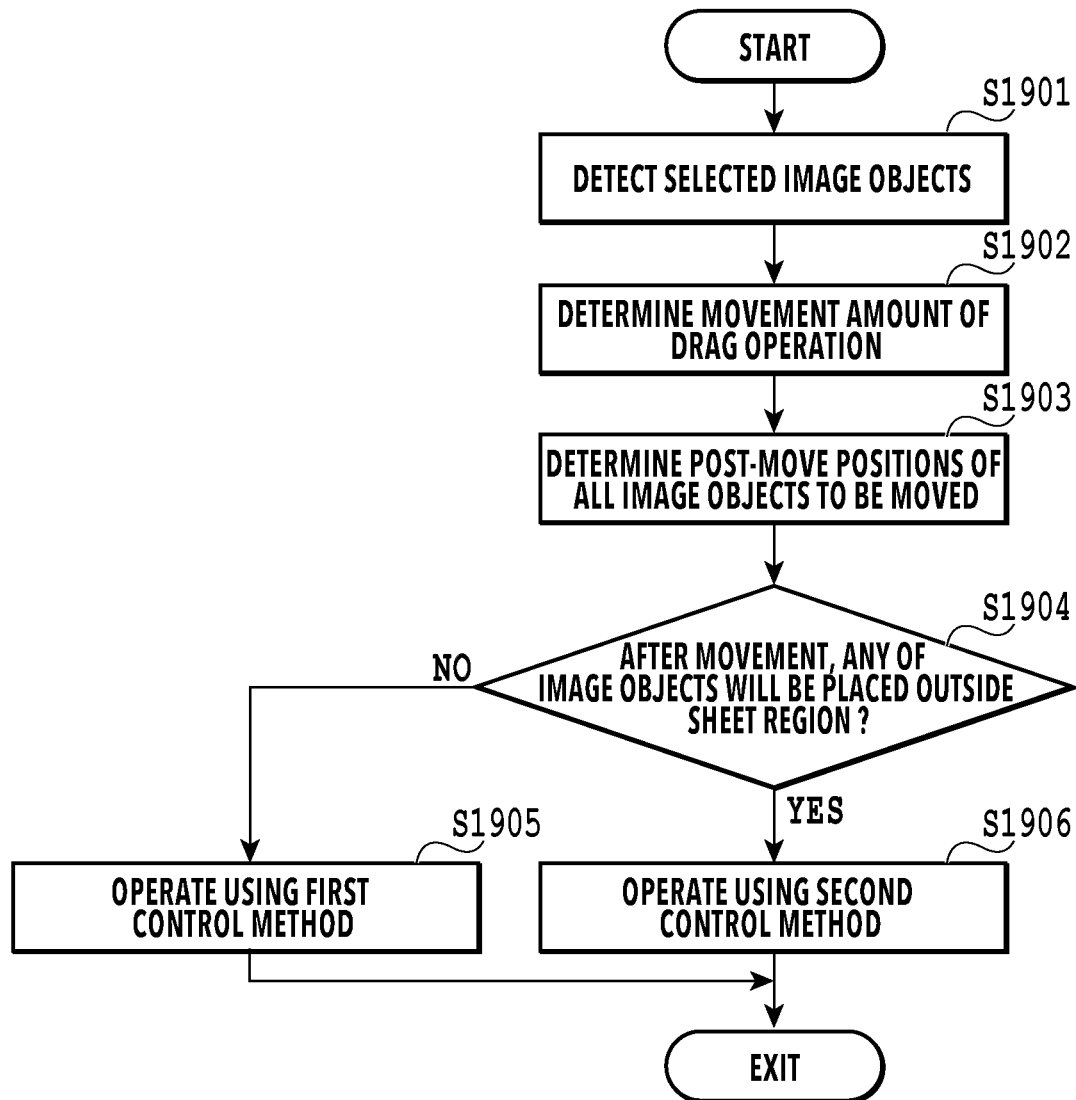
FIG. 19 is a diagram showing a flowchart of determining a control method to employ in moving a plurality of image objects.

FIG. 19 is a diagram showing a flowchart of a layout control method of the present embodiment performed in moving a plurality of image objects. This flowchart is started in response to a user performing an operation of selecting image objects inside a sheet region. Note that the processing in each step in FIG. 19 is performed by the image processing software 300 in the CPU 211 of the host computer 201 by loading program code stored in the ROM 212 into the RAM 213 and executing the program code. Also, a letter "S" used in the descriptions of processing indicates that it is a step in the flowchart.

First, in S1901, the image processing software 300 detects the image objects selected by the user operation. Next, in S1902, in response to the UI controlling unit 302 receiving the user's drag operation, the image processing software 300 determines the amount by which the image objects are moved by the drag operation. Next, in S1903, the image processing software 300 determines the post-move positions of all the image objects selected to be moved.

In S1904, the image processing software 300 determines whether the post-move positions of all the image objects to be moved determined in S1903 are going to be placed outside a sheet region. If it is determined in S1904 that at least one of all the image objects to be moved is going to be placed and located outside the sheet region after being moved, processing proceeds to S1906. If the positions of all the image objects to be moved are going to be placed inside the sheet region after being moved, processing proceeds to S1905. Note that, in the present embodiment, the determination of S1904 is performed irrespective of "whether the parent sheet regions of image objects change" before and after movement. As to the determination of whether a post-move image object is inside a sheet region, the image object may be determined as being inside the sheet region as long as part of the image object is inside the sheet region, or may be determined as being outside the sheet region unless the entire image object is included in the sheet region.

In S1905, the image processing software 300 performs layout control using the first control method to maintain the positional relation between the image objects to be moved, and ends the flowchart. Meanwhile, in S1906, the image processing software 300 performs layout control using the second control method not to maintain the positional relation between the image objects to be moved, and ends the flowchart. Note that, in the second control method, the image objects may be placed in a stacking manner as described in Embodiment 1 using FIG. 16 or may be automatically arranged as described in Embodiment 1 using FIG. 17. Also, as described earlier, the determination in S1904 in FIG. 19 is irrespective of "whether the parent sheet regions change" before and after all the image objects to be moved are moved, but may include, as an element, determination of "whether the parent sheet regions change." For example, image objects may be moved using the first control method in a case when there is no single image object whose parent sheet region changes before and after movement and also when the image objects are placed outside the sheet region after movement.

Figure 20:
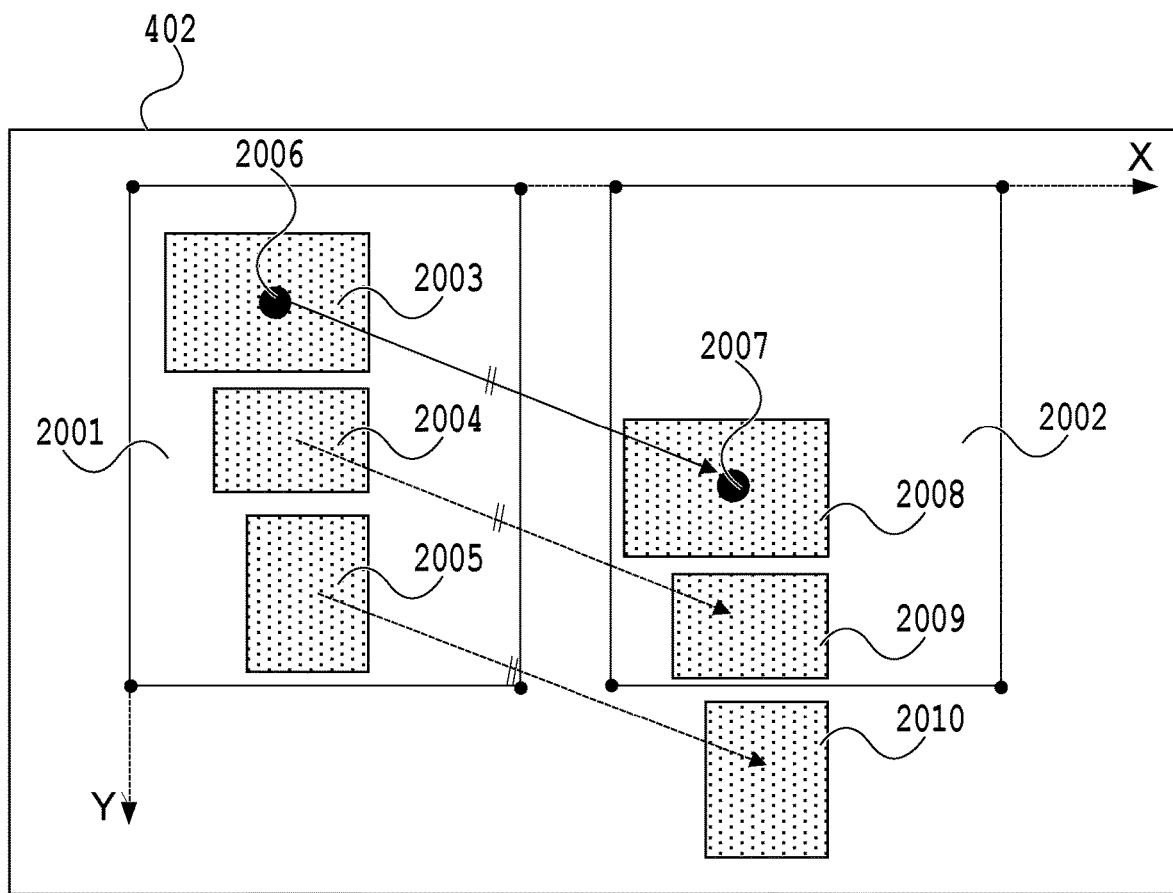
FIG. 20 is a diagram illustrating processing performed in moving a plurality of image objects.

FIG. 20 is a diagram illustrating a flow of layout control of the present embodiment is performed. In FIG. 20, a sheet region 2001 and a sheet region 2002 are placed on the preview part 402, and image objects 2003, 2004, and 2005 are placed on the sheet region 2001. A case is discussed where a user selects the image objects 2003, 2004, and 2005 and performs an operation of dragging a point 2006 on the image object 2003 to a point 2007 on the sheet region 2002, thereby giving an instruction to move them to the sheet region 2002, the image object 2003 thus being a dragged image object. In this case, the layout controlling unit 303 moves the image objects 2003, 2004, and 2005 to the positions of rectangular regions 2008, 2009, and 2010, respectively. In this event, as shown in FIG. 20, the rectangular region 2010 is outside the sheet region, and thus, layout control for the image objects 2003, 2004, and 2005 is performed using the second control method. In other words, the three image objects are placed in a stacking manner.

Figure 21:
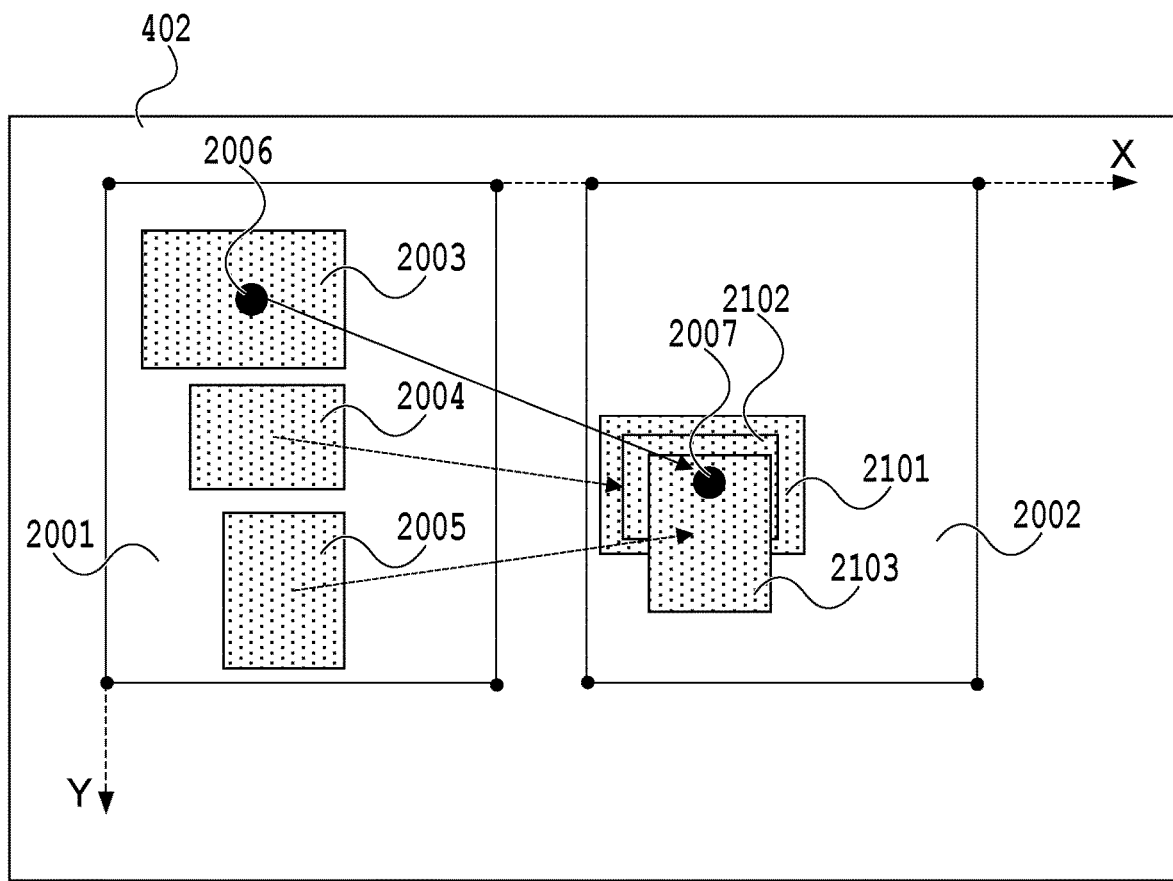
FIG. 21 is a diagram supplementarily illustrating processing performed in moving a plurality of image objects.

FIG. 21 is a diagram showing results of moving the image objects using the second control method in accordance with the flow of the present embodiment. The image objects 2003, 2004, and 2005 are placed at the positions of rectangular 2101, 2102, and 2103, respectively. Note that, it is preferable also in the present embodiment to present ghost images during an operation of dragging image objects so that a user can perform an operation while visually checking the placement results.

As is similar to Embodiment 1, the second control method is not limited to placing image objects in a stacking manner, and the image objects may be automatically arranged on the move-destination sheet region in such a manner that they do not overlap with each other.

As thus described, the present embodiment switches to a gathering operation using the second control method in a case when among a plurality of selected objects, an image object other than the dragged image object (the image object 2004 or 2005) is moved to the outside of a sheet region. This provides the merit of making the move destination of the image objects clearer.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
   a display control unit configured to display a preview on a screen, the preview including a plurality of sheet regions and objects placed on the sheet regions;
   a reception unit configured to receive an operation to change one or more objects placed on the sheet regions to a selected state and to receive a drag operation for the objects in the selected state in accordance with an input of a user; and
   a move unit configured to, in moving the objects in the selected state at once in response to the drag operation, to gather the objects in the selected state onto a same sheet region without maintaining a positional relation between the objects in the selected state in a case when a particular condition is satisfied.

2. The image processing apparatus according to claim 1, wherein the move unit moves the objects selected by the reception unit to a sheet region to which the objects being dragged are moved.

3. The image processing apparatus according to claim 1, wherein the move unit determines that the particular condition is satisfied in a case when the objects selected by the reception unit includes at least one object that belongs to a sheet region different from those to which the other objects belong.

4. The image processing apparatus according to claim 3, wherein the move unit determines that the particular condition is satisfied in a case when the sheet region to which the objects being dragged, among the selected objects belongs, changes before and after movement.

5. The image processing apparatus according to claim 1, wherein the move unit determines that the particular condition is satisfied in a case when the objects selected by the reception unit includes at least one object whose post-move position is outside the sheet regions.

6. The image processing apparatus according to claim 1, wherein, in gathering the objects selected by the reception unit onto the sheet region as a move destination, the move unit stacks the objects on one another.

7. The image processing apparatus according to claim 6, wherein the move unit determines an order in which to stack the objects based on at least one of the following: (a) page numbers assigned to the sheet regions to which the objects belong before movement and (b) an arrangement relation between the selected objects before movement, the arrangement relation indicating which object is a front layer and which object is a back layer.

8. The image processing apparatus according to claim 6, wherein the move unit maintains sizes of the objects in stacking the objects on one another.

9. The image processing apparatus according to claim 1, wherein, in gathering the objects selected by the reception unit onto the sheet region as a move destination, the move unit arranges the objects so that the objects do not overlap with each other.

10. The image processing apparatus according to claim 9, wherein, in arranging the objects so that the objects do not overlap with each other, the move unit adjusts a size of at least some of the objects so that the objects fit inside the sheet region.

11. The image processing apparatus according to claim 1, wherein, among the objects selected by the reception unit, the move unit excludes an object that belongs to a same sheet region before and after movement from the objects to be gathered, and causes the excluded object to stay at a pre-move position.

12. The image processing apparatus according to claim 1, wherein, in a case when the particular condition is not satisfied, the move unit moves the objects while maintaining a positional relation between the objects.

13. The image processing apparatus according to claim 1, wherein, while receiving the drag operation, the reception unit presents ghosts to provide a preview of placement results of the objects.

14. A non-transitory computer readable storage medium storing an object editing program that causes a computer to function as:
   a display control unit configured to display a preview on a screen, the preview including a plurality of sheet regions and objects placed on the sheet regions;
   a reception unit configured to receive an operation to change one or more objects placed on the sheet regions to a selected state and to receive a drag operation for the objects in the selected state in accordance with an input of a user; and
   a move unit configured, in moving the objects in the selected state at once in response to the drag operation, to gather the objects in the selected state onto a same sheet region without maintaining a positional relation between the objects in the selected state in a case when a particular condition is satisfied.

15. A method of controlling an image processing apparatus having an object editing function, the method comprising:
   displaying a preview on a screen, the preview including a plurality of sheet regions and objects placed on the sheet regions;
   receiving an operation to change one or more objects placed on the sheet regions to a selected state and receiving a drag operation for the objects in the selected state in accordance with an input of a user; and
   moving the objects in the selected state at once in response to the drag operation, to gather the objects in the selected state onto a same sheet region without maintaining a positional relation between the objects in the selected state in a case when a particular condition is satisfied.

* * * * *